(12) United States Patent
Park

(10) Patent No.: US 12,477,566 B2
(45) Date of Patent: Nov. 18, 2025

(54) METHOD AND APPARATUS FOR TRANSMITTING SIGNAL IN WIRELESS COMMUNICATION SYSTEM

(71) Applicant: LG ELECTRONICS INC., Seoul (KR)

(72) Inventor: Jungyong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 613 days.

(21) Appl. No.: 17/997,084

(22) PCT Filed: Apr. 21, 2021

(86) PCT No.: PCT/KR2021/005043
§ 371 (c)(1),
(2) Date: Oct. 25, 2022

(87) PCT Pub. No.: WO2021/221379
PCT Pub. Date: Nov. 4, 2021

(65) Prior Publication Data
US 2023/0319855 A1 Oct. 5, 2023

(30) Foreign Application Priority Data

Apr. 27, 2020 (KR) .................. 10-2020-0050481
Aug. 19, 2020 (KR) .................. 10-2020-0104051

(51) Int. Cl.
*H04W 8/00* (2009.01)
*H04L 5/00* (2006.01)
*H04W 72/40* (2023.01)

(52) U.S. Cl.
CPC ........... *H04W 72/40* (2023.01); *H04L 5/0023* (2013.01); *H04L 5/0039* (2013.01); *H04L 5/0048* (2013.01); *H04W 8/005* (2013.01)

(58) Field of Classification Search
CPC ..................................................... H04W 72/40
USPC ......................................................... 370/329
See application file for complete search history.

(56) References Cited

U.S. PATENT DOCUMENTS

2018/0124771 A1  5/2018  Mok et al.
2018/0343605 A1  11/2018  Wu et al.

FOREIGN PATENT DOCUMENTS

| JP | 2018-129803 | 8/2018 |
| JP | 2018-527845 | 9/2018 |
| KR | 10-2014-0041514 | 4/2014 |
| KR | 10-2014-0068088 | 6/2014 |
| WO | 2015-029954 | 3/2015 |
| WO | 2018-030306 | 2/2018 |

OTHER PUBLICATIONS

Japan Patent Office Application No. 2022-565647, Office Action dated May 7, 2024, 4 pages.

(Continued)

*Primary Examiner* — Angel T Brockman
(74) *Attorney, Agent, or Firm* — LEE, HONG, DEGERMAN, KANG & WAIMEY

(57) ABSTRACT

Disclosed herein is a method of operating a terminal in a wireless communication system, including: receiving information on a location of the terminal; generating a zone identify (zone ID) based on the information on the location of the terminal; determining a discovery slot mapping set based on the zone identify; and transmitting a discovery signal based on the discovery slot mapping set.

15 Claims, 30 Drawing Sheets

(56) References Cited

OTHER PUBLICATIONS

PCT International Application No. PCT/KR2021/005043, International Search Report dated Jul. 29, 2021, 4 pages.
3rd Generation Partnership Project, "Technical Specification Group Radio Access Network; NR; Radio Resource Control (RRC) protocol specification (Release 16)," 3GPP TS 38.331 V16.0.0, Mar. 2020, 837 pages.

METHOD AND APPARATUS FOR TRANSMITTING SIGNAL IN WIRELESS COMMUNICATION SYSTEM

TECHNICAL FIELD

The present disclosure relates to a wireless communication system and, more particularly, to a method and apparatus for transmitting an efficient discovery signal in a wireless communication system.

BACKGROUND

A wireless communication system is a multiple access system that supports communication of multiple users by sharing available system resources (e.g. a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

The present disclosure is directed to provide a method and apparatus for transmitting a discovery signal in a wireless communication system.

The present disclosure is directed to provide a method and apparatus for determining a synchronization signal transmission time in a wireless communication system.

The technical objects to be achieved in the present disclosure are not limited to the above-mentioned technical objects, and other technical objects that are not mentioned may be considered by those skilled in the art through the embodiments described below.

An embodiment of the present disclosure may include receiving information on a location of a terminal, generating a zone ID (zone identity) based on the information on the location of the terminal, determining a discovery slot mapping set based on the zone ID, and transmitting a discovery signal based on the discovery slot mapping set.

In an embodiment of the present disclosure, a terminal may include a transceiver and a processor coupled with the transceiver. The transceiver may receive information on a location of the terminal. The processor may generate a zone ID (zone identity) based on the information on the location of the terminal and determine a discovery slot mapping set based on the zone ID. The transceiver may transmit a discovery signal based on the discovery slot mapping set.

In an embodiment of the present disclosure, a device may include at least one memory and at least one processor functionally coupled with the at least one memory. The at least one processor may control the device to receive information on a location of the device. The at least one processor may control the device to generate a zone ID (zone identity) based on the information on the location of the device. The at least one processor may control the device to determine a discovery slot mapping set based on the zone ID. The at least one processor may control the device to transmit a discovery signal based on the discovery slot mapping set.

In an embodiment of the present disclosure, a non-transitory computer-readable medium storing at least one instruction may include the at least one instruction that is executable by a processor. The at least one instruction may instruct the computer-readable medium to receive information on a location of the computer-readable medium. The at least one instruction may instruct the computer-readable medium to generate a zone ID (zone identity) based on the information on the location of the computer-readable medium. The at least one instruction may instruct the computer-readable medium to determine a discovery slot mapping set based on the zone ID. The at least one instruction may instruct the computer-readable medium to transmit a discovery signal based on the discovery slot mapping set.

The above-described aspects of the present disclosure are only a part of the preferred embodiments of the present disclosure, and various embodiments reflecting technical features of the present disclosure may be derived and understood by those skilled in the art on the basis of the detailed description of the present disclosure provided below.

The following effects may be produced by embodiments based on the present disclosure.

According to the present disclosure, collision of discovery signals may be reduced in a discovery procedure using half duplex.

According to the present disclosure, efficient transmission of a discovery signal may reduce the delay of a sidelink signal.

According to the present disclosure, a terminal performing communication between terminals may determine an efficient synchronization signal transmission time.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to aid understanding of the present disclosure, and embodiments of the present disclosure may be provided together with a detailed description. However, the technical features of the present disclosure are not limited to a specific drawing, and features disclosed in each drawing may be combined with each other to constitute a new embodiment. Reference numerals in each drawing may mean structural elements.

FIG. 12 is a view illustrating an example of a zone ID that is applicable to the present disclosure.

FIG. 13 is a view illustrating an example of a zone ID that is applicable to the present disclosure.

DETAILED DESCRIPTION

Figure 1:
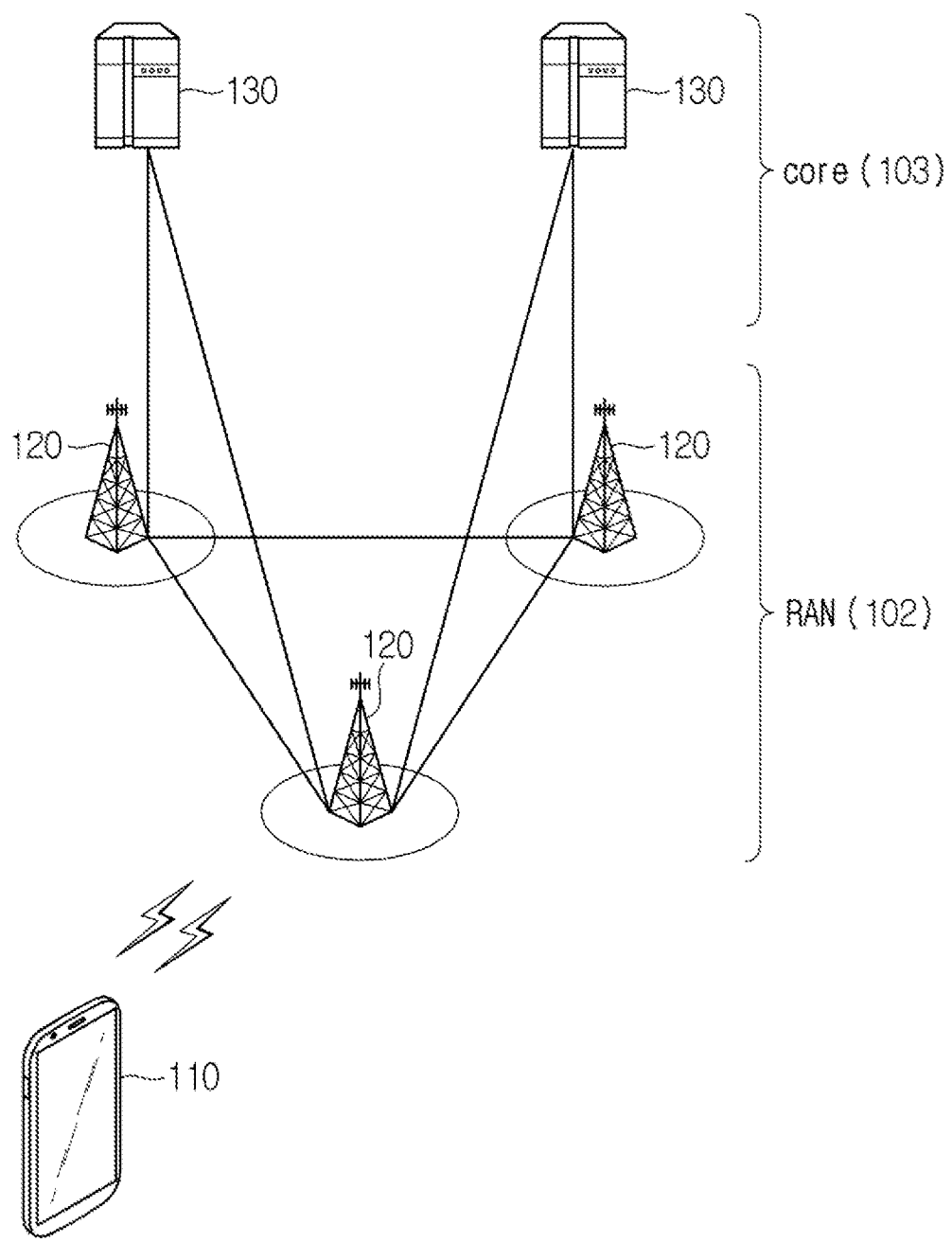
FIG. 1 illustrates a structure of a wireless communication system according to an embodiment of the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B". In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present specification may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in the present disclosure, reference may be made to a wireless communication standard document published before the present disclosure is filed. For example, the following document may be referred to.

(1) 3GPP LTE
  3GPP TS 36.211: Physical channels and modulation
  3GPP TS 36.212: Multiplexing and channel coding
  3GPP TS 36.213: Physical layer procedures
  3GPP TS 36.214: Physical layer; Measurements
  3GPP TS 36.300: Overall description
  3GPP TS 36.304: User Equipment (UE) procedures in idle mode
  3GPP TS 36.314: Layer 2—Measurements
  3GPP TS 36.321: Medium Access Control (MAC) protocol
  3GPP TS 36.322: Radio Link Control (RLC) protocol
  3GPP TS 36.323: Packet Data Convergence Protocol (PDCP)
  3GPP TS 36.331: Radio Resource Control (RRC) protocol (2) 3GPP NR (e.g. 5G)
  3GPP TS 38.211: Physical channels and modulation
  3GPP TS 38.212: Multiplexing and channel coding
  3GPP TS 38.213: Physical layer procedures for control
  3GPP TS 38.214: Physical layer procedures for data
  3GPP TS 38.215: Physical layer measurements
  3GPP TS 38.300: Overall description
  3GPP TS 38.304: User Equipment (UE) procedures in idle mode and in RRC inactive state
  3GPP TS 38.321: Medium Access Control (MAC) protocol
  3GPP TS 38.322: Radio Link Control (RLC) protocol
  3GPP TS 38.323: Packet Data Convergence Protocol (PDCP)
  3GPP TS 38.331: Radio Resource Control (RRC) protocol
  3GPP TS 37.324: Service Data Adaptation Protocol (SDAP)
  3GPP TS 37.340: Multi-connectivity; Overall description Communication System Applicable to the Present Disclosure FIG. 1 illustrates a structure of a wireless communication system according to an embodiment of the present disclosure. The embodiment of FIG. 1 may be combined with various embodiments of the present disclosure.

Referring to FIG. 1, a wireless communication system includes a radio access network (RAN) 102 and a core network 103. The radio access network 102 includes a base station 120 that provides a control plane and a user plane to a terminal 110. The terminal 110 may be fixed or mobile, and may be called other terms such as a user equipment (UE), a mobile station (MS), a subscriber station (SS), a mobile subscriber station (MSS), a mobile terminal, an advanced mobile station (AMS), or a wireless device. The base station 120 refers to a node that provides a radio access service to the terminal 110, and may be called other terms such as a fixed station, a Node B, an eNB (eNode B), a gNB (gNode B), an ng-eNB, an advanced base station (ABS), an access point, a base transceiver system (BTS), or an access point (AP). The core network 103 includes a core network entity 130. The core network entity 130 may be defined in various ways according to functions, and may be called other terms such as a core network node, a network node, or a network equipment.

Components of a system may be referred to differently according to an applied system standard. In the case of the LTE or LTE-A standard, the radio access network 102 may be referred to as an Evolved-UMTS Terrestrial Radio Access Network (E-UTRAN), and the core network 103 may be referred to as an evolved packet core (EPC). In this case, the core network 103 includes a Mobility Management Entity (MME), a Serving Gateway (S-GW), and a packet data network-gateway (P-GW). The MME has access information of the terminal or information on the capability of the terminal, and this information is mainly used for mobility management of the terminal. The S-GW is a gateway having an E-UTRAN as an endpoint, and the P-GW is a gateway having a packet data network (PDN) as an endpoint.

In the case of the 5G NR standard, the radio access network 102 may be referred to as an NG-RAN, and the core network 103 may be referred to as a 5GC (5G core). In this case, the core network 103 includes an access and mobility management function (AMF), a user plane function (UPF), and a session management function (SMF). The AMF provides a function for access and mobility management in units of terminals, the UPF performs a function of mutually transmitting data units between an upper data network and the radio access network 102, and the SMF provides a session management function.

The BSs 120 may be connected to one another via Xn interface. The BS 120 may be connected to one another via core network 103 and NG interface. More specifically, the BSs 130 may be connected to an access and mobility management function (AMF) via NG-C interface, and may be connected to a user plane function (UPF) via NG-U interface.

Figure 2:
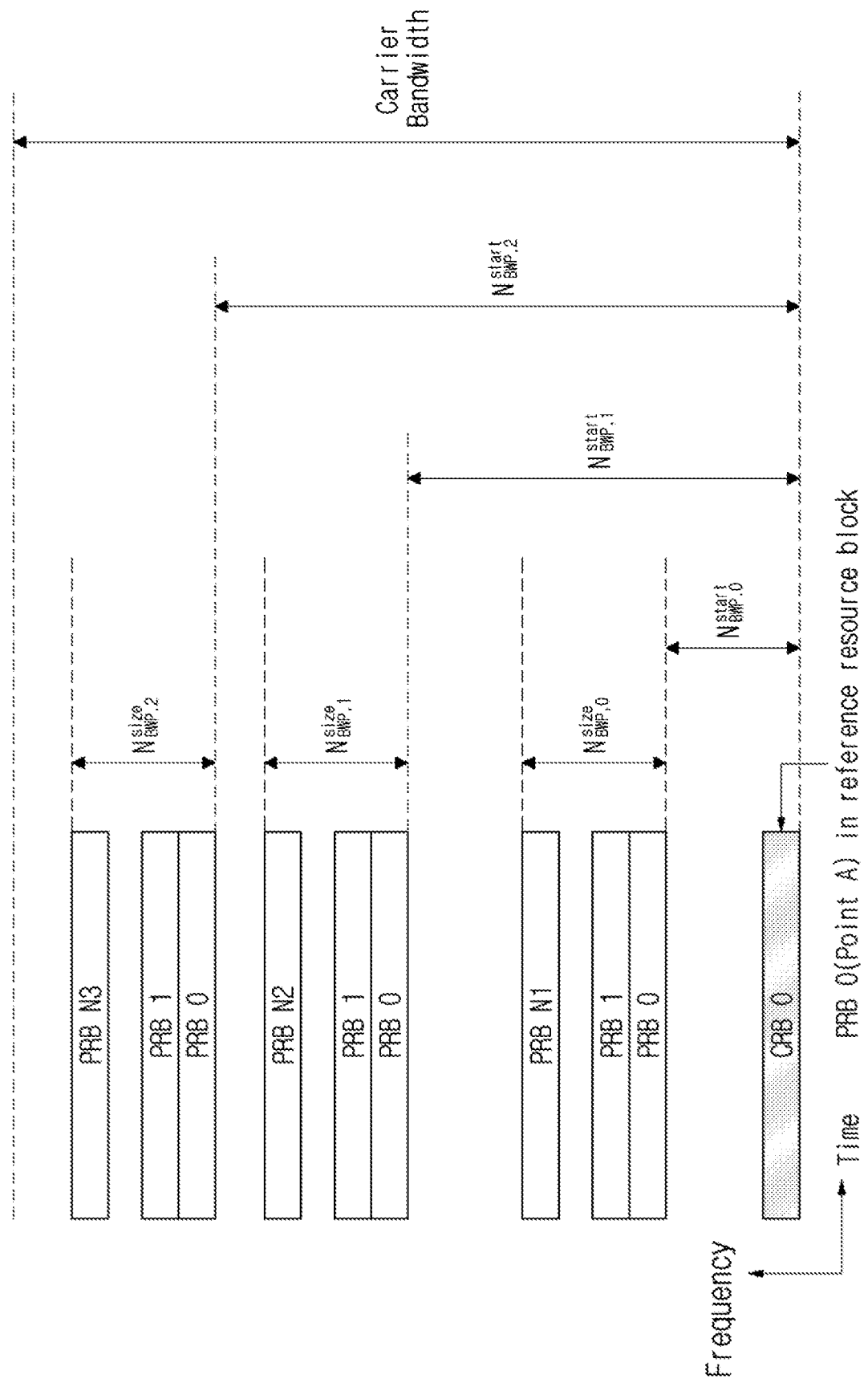
FIG. 2 illustrates an example of BWP according to an embodiment of the present disclosure.

FIG. 2 illustrates an example of a BWP applicable to the present disclosure. The embodiment of FIG. 2 may be combined with various embodiments of the present disclosure. It is assumed in the embodiment of FIG. 2 that the number of BWPs is 3.

Referring to FIG. 2, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset (NstartBWP) from the point A, and a bandwidth (NsizeBWP). For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

V2X or Sidelink Communication

Figure 3A:
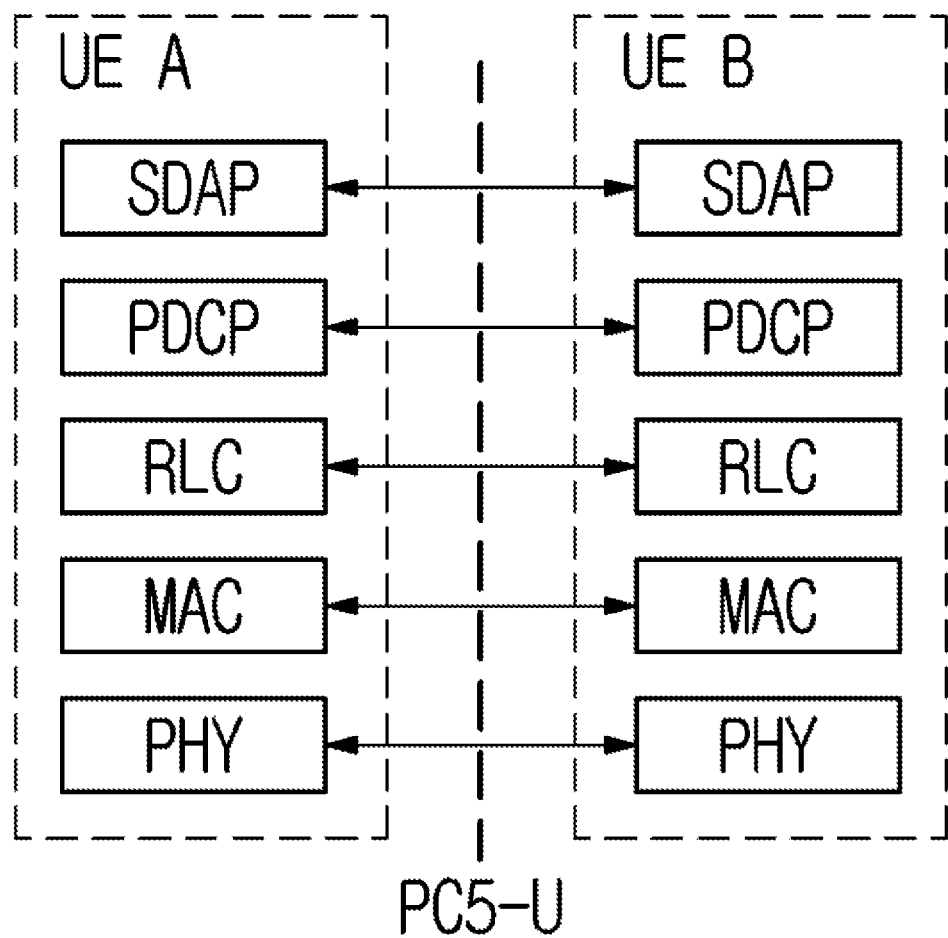
FIG. 3A and FIG. 3B illustrate a radio protocol architecture for SL communication according to an embodiment of the present disclosure.
Figure 3B:
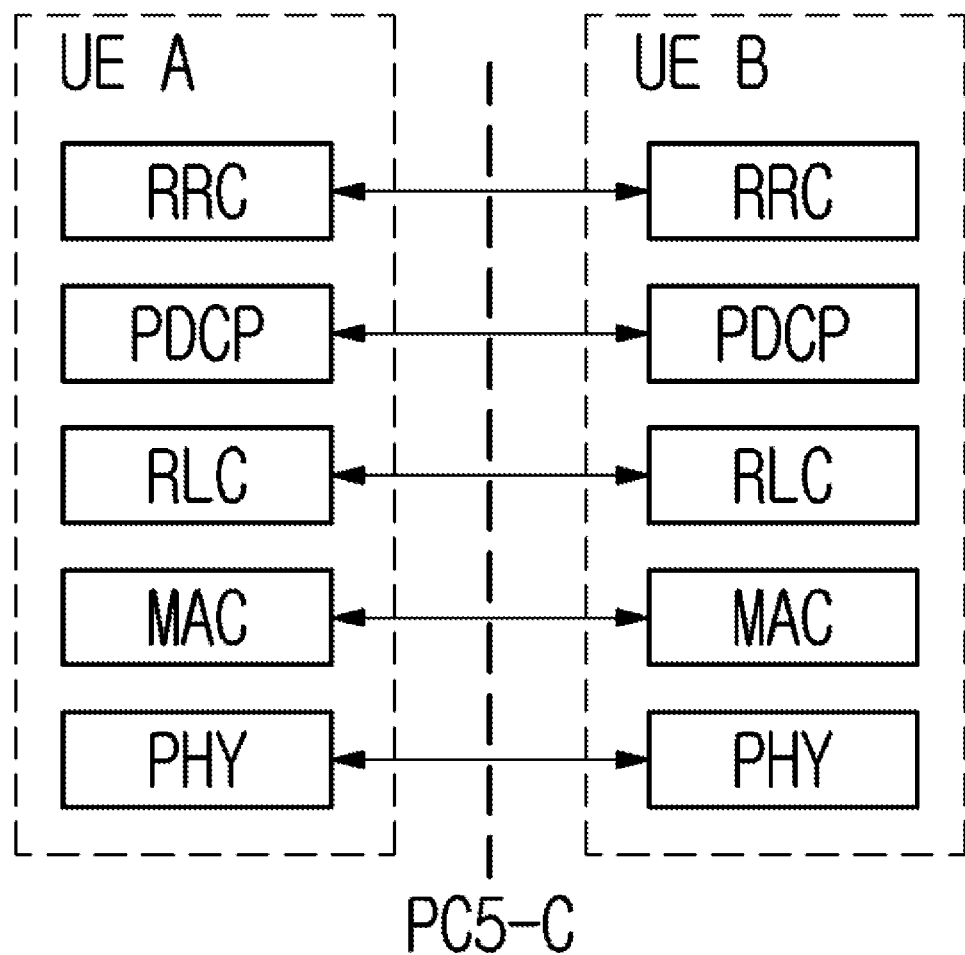

FIGS. 3A and 3B illustrate a radio protocol architecture for a SL communication applicable to the present disclosure.

The embodiment of FIGS. 3A and 3B may be combined with various embodiments of the present disclosure. More specifically, FIG. 3A exemplifies a user plane protocol stack, and FIG. 3B exemplifies a control plane protocol stack.

Sidelink Synchronization Signal (SLSS) and Synchronization Information

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-) configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

For example, based on Table 1, the UE may generate an S-SS/PSBCH block (i.e., S-SSB), and the UE may transmit the S-SS/PSBCH block (i.e., S-SSB) by mapping it on a physical resource.

TABLE 1

■ Time-frequency structure of an S-SS/PSBCH block
In the time domain, an S-SS/PSBCH block consists of $N_{symb}^{S-SSB}$ OFDM symbols, numbered in increasing order from 0 to $N_{symb}^{S-SSB} - 1$ within the S-SS/PSBCH block, where S-PSS, S-SSS, and PSBCH with associated DM-RS are mapped to symbols as given by Table 8.4.3.1-1.
The number of OFDM symbols in an S-SS/PSBCH block $N_{symb}^{S-SSB} = 13$ for normal cyclic prefix and $N_{symb}^{S-SSB} = 11$ for extended cyclic prefix. The first OFDM symbol in an S-SS/PSBCH block is the first OFDM symbol in the slot.
In the frequency domain, an S-SS/PSBCH block consists of 132 contiguous subcarriers with the subcarriers numbered in increasing order from 0 to 131 within the sidelink S-SS/PSBCH block. The quantities k and l represent the frequency and time indices, respectively, within one sidelink S-SS/PSBCH block.
For an S-SS/PSBCH block, the UE shall use
- antenna port 4000 for transmission of S-PSS, S-SSS, PSBCH and DM-RS for PSBCH;
- the same cyclic prefix length and subcarrier spacing for the S-PSS, S-SSS, PSBCH and DM-RS for PSBCH, TABLE 1-continued Table 8.4.3.1-1: Resources within an S-SS/PSBCH block for S-PSS, S-SSS, PSBCH, and DM-RS.

| Channel or signal | OFDM symbol number l relative to the start of an S-SS/PSBCH block | Subcarrier number k relative to the start of an S-SS/PSBCH block |
|---|---|---|
| S-PSS | 1, 2 | 2, 3, . . . , 127, 128 |
| S-SSS | 3, 4 | 2, 3, . . . , 127, 128 |
| Set to zero | 1, 2, 3, 4 | 0, 1, 129, 130, 131 |
| PSBCH | 0, 5, 6, . . . , $N_{symb}^{S\text{-}SSB} - 1$ | 0, 1, . . . , 131 |
| DM-RS for PSBCH | 0, 5, 6, . . . , $N_{symb}^{S\text{-}SSB} - 1$ | 0, 4, 8, . . . , 128 |

Synchronization Acquisition of SL Terminal

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Figure 4:
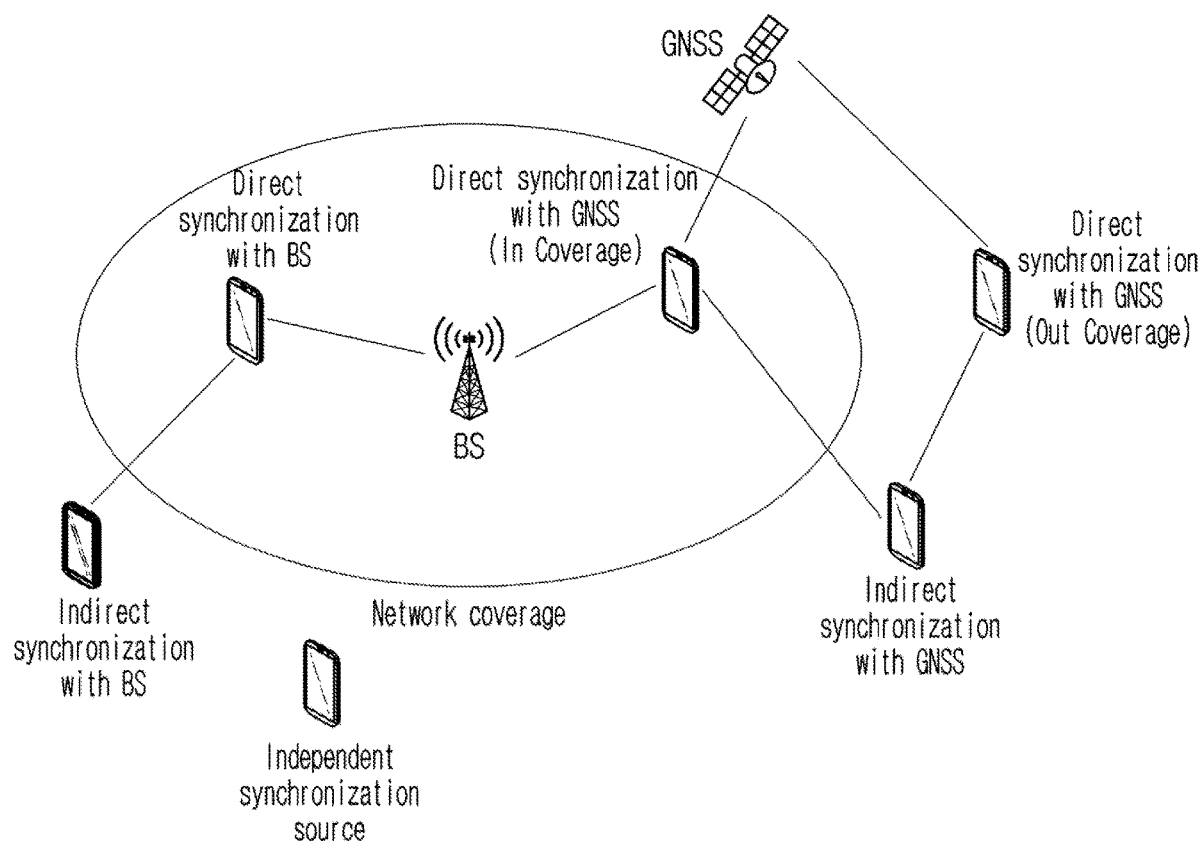
FIG. 4 illustrates a synchronization source or a synchronization reference of V2X according to an embodiment of the present disclosure.

FIG. 4 illustrates a synchronization source or synchronization reference of V2X applicable to the present disclosure. The embodiment of FIG. 4 may be combined with various embodiments of the present disclosure.

Referring to FIG. 4, in V2X, a UE may be synchronized with a GNSS directly or indirectly through a UE (within or out of network coverage) directly synchronized with the GNSS. When the GNSS is configured as a synchronization source, the UE may calculate a direct subframe number (DFN) and a subframe number by using a coordinated universal time (UTC) and a (pre)determined DFN offset.

Alternatively, the UE may be synchronized with a BS directly or with another UE which has been time/frequency synchronized with the BS. For example, the BS may be an eNB or a gNB. For example, when the UE is in network coverage, the UE may receive synchronization information provided by the BS and may be directly synchronized with the BS. Thereafter, the UE may provide synchronization information to another neighboring UE. When a BS timing is set as a synchronization reference, the UE may follow a cell associated with a corresponding frequency (when within the cell coverage in the frequency), a primary cell, or a serving cell (when out of cell coverage in the frequency), for synchronization and DL measurement.

The BS (e.g., serving cell) may provide a synchronization configuration for a carrier used for V2X or SL communication. In this case, the UE may follow the synchronization configuration received from the BS. When the UE fails in detecting any cell in the carrier used for the V2X or SL communication and receiving the synchronization configuration from the serving cell, the UE may follow a predetermined synchronization configuration.

Alternatively, the UE may be synchronized with another UE which has not obtained synchronization information directly or indirectly from the BS or GNSS. A synchronization source and a preference may be preset for the UE. Alternatively, the synchronization source and the preference may be configured for the UE by a control message provided by the BS.

An SL synchronization source may be related to a synchronization priority. For example, the relationship between synchronization sources and synchronization priorities may be defined as shown in [Table 2] or [Table 3]. [Table 2] or [Table 3] is merely an example, and the relationship between synchronization sources and synchronization priorities may be defined in various manners.

TABLE 2

| Priority Level | GNSS-based synchronization | eNB/gNB-based synchronization |
|---|---|---|
| P0 | GNSS | eNB/gNB |
| P1 | All UEs synchronized directly with GNSS | All UEs synchronized directly with NB/gNB |
| P2 | All UEs synchronized indirectly with GNSS | All UEs synchronized indirectly with eNB/gNB |
| P3 | All other UEs | GNSS |
| P4 | N/A | All UEs synchronized directly with GNSS |
| P5 | N/A | All UEs synchronized indirectly with GNSS |
| P6 | N/A | All other UEs |

TABLE 3

| Priority Level | GNSS-based synchronization | eNB/gNB-based synchronization |
|---|---|---|
| P0 | GNSS | eNB/gNB |
| P1 | All UEs synchronized directly with GNSS | All UEs synchronized directly with eNB/gNB |
| P2 | All UEs synchronized indirectly with GNSS | All UEs synchronized indirectly with eNB/gNB |
| P3 | eNB/gNB | GNSS |
| P4 | All UEs synchronized directly with eNB/gNB | All UEs synchronized directly with GNSS |
| P5 | All UEs synchronized indirectly with eNB/gNB | All UEs synchronized indirectly with GNSS |
| P6 | Remaining UE(s) with lower priority | Remaining UE(s) with lower priority |

In [Table 2] or [Table 3], P0 may represent a highest priority, and P6 may represent a lowest priority. In [Table 2] or [Table 3], the BS may include at least one of a gNB or an eNB.

Whether to use GNSS-based synchronization or eNB/gNB-based synchronization may be (pre)determined. In a single-carrier operation, the UE may derive its transmission timing from an available synchronization reference with the highest priority.

For example, the UE may (re)select a synchronization reference, and the UE may obtain synchronization from the synchronization reference. In addition, the UE may perform SL communication (e.g., PSCCH/PSSCH transmission/reception, physical sidelink feedback channel (PSFCH) transmission/reception, S-SSB transmission/reception, reference signal transmission/reception, etc.) based on the obtained synchronization.

FIGS. 9A and 9B illustrate a procedure of performing V2X or SL communication by a terminal based on a transmission mode applicable to the present disclosure. The embodiment of FIGS. 9A and 9B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

Figure 5A:
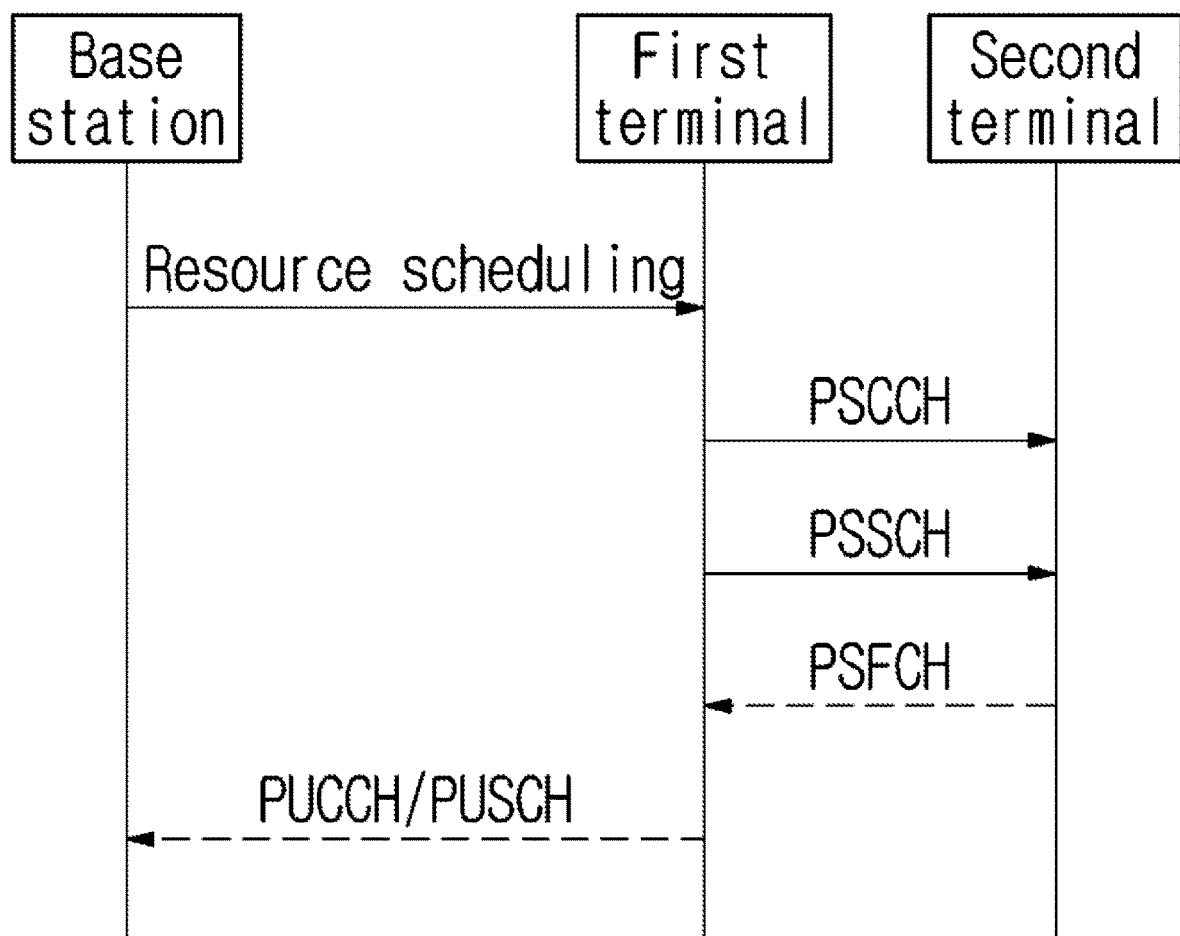
FIG. 5A and FIG. 5B illustrate a procedure in which a terminal performs V2X or SL communication according to a transmission mode, in accordance with an embodiment of the present disclosure.

For example, FIG. 5A exemplifies a UE operation related to an LTE transmission mode 1 or an LTE transmission mode 3. Alternatively, for example, FIG. 5B exemplifies a UE operation related to an NR resource allocation mode 1. For example, the LTE transmission mode 1 may be applied to general SL communication, and the LTE transmission mode 3 may be applied to V2X communication.

Figure 5B:
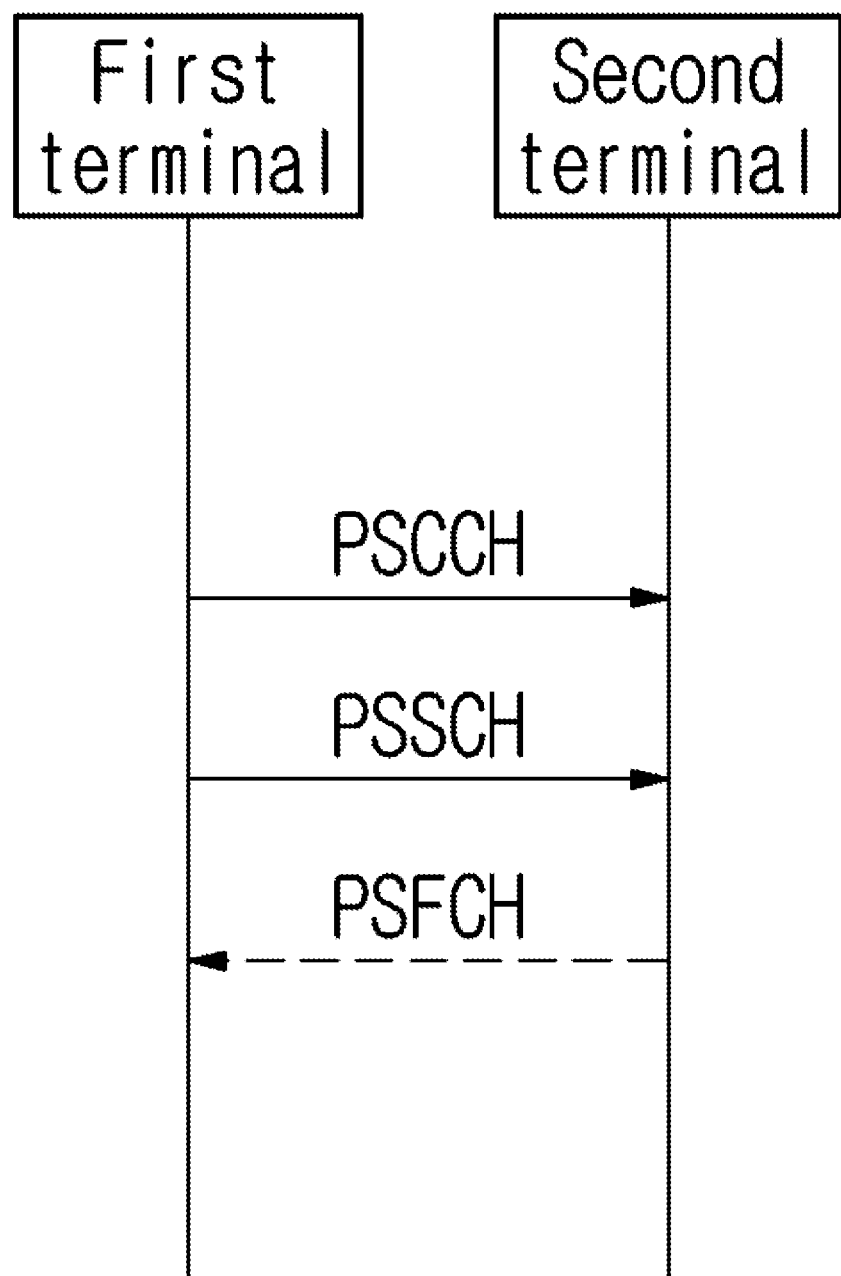

For example, FIG. 5B exemplifies a UE operation related to an LTE transmission mode 2 or an LTE transmission mode 4. Alternatively, for example, FIG. 5A exemplifies a UE operation related to an NR resource allocation mode 2.

Referring to FIG. 5A, in the LTE transmission mode 1, the LTE transmission mode 3, or the NR resource allocation mode 1, a BS may schedule an SL resource to be used by the UE for SL transmission. For example, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

Subsequently, the first UE may transmit a PSCCH (e.g., sidelink control information (SCI) or 1st-stage SCI) to a second UE based on the resource scheduling. After then, the first UE may transmit a PSSCH (e.g., 2nd-stage SCI, MAC PDU, data, etc.) related to the PSCCH to the second UE. After then, the first UE may receive a PSFCH related to the PSCCH/PSSCH from the second UE. For example, HARQ feedback information (e.g., NACK information or ACK information) may be received from the second UE through the PSFCH. After then, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1. Table 4 shows an example of a DCI for SL scheduling.

TABLE 4

3GPP TS 38.212

■ Format 3_0
DCI format 3_0 is used for scheduling of NR PSCCH and NR PSSCH in one cell.
The following information is transmitted by means of the DCI format 3_0 with CRC scrambled by SL-RNTI or SL-CS-RNTI:
- Resource pool index -$\lceil \log_2 I \rceil$ bits, where I is the number of resource pools for transmission configured by the higher layer parameter sl-TxPoolScheduling.
- Time gap - 3 bits determined by higher layer parameter sl-DCI-ToSL-Trans, as defined in clause 8.1.2.1 of [6, TS 38.214]
- HARQ process number - 4 bits as defined in clause 16.4 of [5, TS 38.213]
- New data indicator - 1 bit as defined in clause 16.4 of [5, TS 38.213]
- Lowest index of the subchannel allocation to the initial transmission -$\lceil \log_2(N_{subChannel}^{SL}) \rceil$ bits as defined in clause 8.1.2.2 of [6, TS 38.214]
- SCI format 1-A fields according to clause 8.3.1.1:
  - Frequency resource assignment.
  - Time resource assignment.
- PSFCH-to-HARQ feedback timing indicator -$\lceil \log_2 N_{fb\_timing} \rceil$ bits, where $N_{fb\_timing}$ is the number of entries in the higher layer parameter sl-PSFCH-ToPUCCH, as defined in clause 16.5 of [5, TS 38.213]
- PUCCH resource indicator - 3 bits as defined in clause 16.5 of [5, TS 38.213].
- Configuration index - 0 bit if the UE is not configured to monitor DCI format 3_0 with CRC scrambled by SL-CS-RNTI; otherwise 3 bits as defined in clause 8.1.2 of [6, TS 38.214], if the UE is configured to monitor DCI format 3_0 with CRC scrambled by SL-CS-RNTI, this field is reserved for DCI format 3_0 with CRC scrambled by SL-RNTI.
- Counter sidelink assignment index - 2 bits
  - 2 bits as defined in clause 16.5.2 of [5, TS 38.213] if the UE is configured with pdsch-HARQ-ACK-Codebook = dynamic
  - 2 bits as defined in clause 16.5.1 of [5, TS 38.213] If the UE is configured with pdsch-HARQ-ACK-Codebook = semi-static
- Padding bits, if required TABLE 4-continued

3GPP TS 38.212

■ Format 3_1
DCI format 3_1 is used for scheduling of LTE PSCCH and LTE PSSCH in one cell.
The following information is transmitted by means of the DCI format 3_1 with CRC scrambled
by SL-L-CS-RNTI:
- Timing offset - 3 bits determined by higher layer parameter sl-TimeOffsetEUTRA, as
  defined in clause 16.6 of [5, TS 38.213]
- Carrier indicator -3 bits as defined in 5.3.3.1.9A of [11, TS 36.212].
- Lowest index of the subchannel allocation to the initial transmission - $\lceil \log_2(N_{subchannel}^{SL}) \rceil$
  bits as defined in 5.3.3.1.9A of [11, TS 36.212].
- Frequency resource location of initial transmission and retransmission, as defined in
  5.3.3.1.9A of [11, TS 36.212]
- Time gap between initial transmission and retransmission, as defined in 5.3.3.1.9A of
  [11, TS 36.212]
- SL index - 2 bits as defined in 5.3.3.1.9A of [11, TS 36.212]
- SL SPS configuration index - 3 bits as defined in clause 5.3.3.1.9A of [11, TS 36.212].
-   Activation/release indication - 1 bit as defined in clause 5.3.3.1.9A of [11, TS
36.212].

Referring to FIG. 5B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannel(s). For example, subsequently, a first UE which has selected resource(s) from a resource pool by itself may transmit a PSCCH (e.g., sidelink control information (SCI) or 1st-stage SCI) to a second UE by using the resource(s). After then, the first UE may transmit a PSSCH (e.g., 2nd-stage SCI, MAC PDU, data, etc.) related to the PSCCH to the second UE. In step S8030, the first UE may receive a PSFCH related to the PSCCH/PSSCH from the second UE.

Referring to FIGS. 5A and 5B, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a 1st SCI, a first SCI, a 1st-stage SCI or a 1st-stage SCI format, and a SCI transmitted through a PSSCH may be referred to as a 2nd SCI, a second SCI, a 2nd-stage SCI or a 2nd-stage SCI format. For example, the 1st-stage SCI format may include a SCI format 1-A, and the 2nd-stage SCI format may include a SCI format 2-A and/or a SCI format 2-B. Table 5 shows an example of a 1st-stage SCI format.

TABLE 5

3GPP TS 38.212

■ SCI format 1-A
SCI format 1-A is used for the scheduling of PSSCH and $2^{nd}$-stage-SCI on PSSCH
The following information is transmitted by means of the SCI format 1-A:
 - Priority – 3 bits as specified in clause 5.4.3.3 of [12, TS 23,287] and clause 5.22.1.3.1
   of [8, TS 38.3211.

- Frequency resource assignment $-\left\lceil \log_2\left(\frac{N_{subChanel}^{SL}(N_{subChannel}^{SL}+1)}{2}\right)\right\rceil$ bits when the value of the higher layer parameter sl-MaxNumPerReserve is configured to 2; otherwise $\left\lceil \log_2\left(\frac{N_{subChannel}^{SL}(N_{subChannel}^{SL}+1)(2N_{subChannel}^{Sl}+1)}{6}\right)\right\rceil$ bits when the value of the higher layer parameter sl-MaxNumPerReserve is configured to 3, as defined in clause 8.1.2.2 of [6,
   TS 38.2141.
 - Time resource assignment – 5 bits when the value of the higher layer parameter sl-
   MaxNumPerReserve is configured to 2; otherwise 9 bits when the value of the higher
   layer parameter sl-MaxNumPerReserve is configured to 3, as defined in clause 8.1.2.1
   of [6, TS 38.214].
 - Resource reservation period $-\lceil \log_2 N_{rsv\_period} \rceil$ bits as defined in clause 8.1.4 of [6, TS
   38.214], where $N_{rsv\_period}$ is the number of entries in the higher layer parameter sl-
   ResourceReservePeriodList, if higher layer parameter sl-MultiReserveResource is
   configured: 0 bit otherwise.

TABLE 5-continued

3GPP TS 38.212

- DMRS pattern – $[\log_2 N_{pattern}]$ bits as defined in clause 8.4.1.1.2 of [4, TS 38.211], where $N_{pattern}$ is the number of DMRS patterns configured by higher layer parameter sl-PSSCH-DMRS-TimePatternList.
- $2^{nd}$-stage SCI format – 2 bits as defined in Table 8.3.1.1-1.
- Beta_offset indicator – 2 bits as provided by higher layer parameter sl-BetaOffsets2ndSCI and Table 8.3.1.1-2.
- Number of DMRS port – 1 bit as defined in Table 8.3.1.1-3.
- Modulation and coding scheme – 5 bits as defined in clause 8.1.3 of [6, TS 38.214].
- Additional MCS table indicator – as defined in clause 8.1.3.1 of [6, TS 38.214]: 1 bit if one MCS table is configured by higher layer parameter sl-Additional-MCS-Table; 2 bits if two MCS tables are configured by higher layer parameter sl- Additional-MCS-Table; 0 bit otherwise.
- PSFCH overhead indication – 1 bit as defined clause 8.1.3.2 of [6, TS 38.214] if higher layer parameter sl-PSFCHI-Period = 2 or 4; 0 bit otherwise.
- Reserved – a number of bits as determined by higher layer parameter sl-NumReservedBits, with value set to zero.

TABLE 6

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 7

Mapping of Beta_offset indicator values to indexes

| Value of Beta_offset indicator | Beta_offset index in Table 9.3-2 of [5, TS38.213] |
|---|---|
| 00 | 1st index provided by higher layer parameter sl-BetaOffsets2ndSCI |
| 01 | 2nd index provided by higher layer parameter sl-BetaOffsets2ndSCI |
| 10 | 3rd index provided by higher layer parameter sl-BetaOffsets2ndSCI |
| 11 | 4th index provided by higher layer parameter sl-BetaOffsets2ndSCI |

Table 8 shows an example of a 2nd-stage SCI format.

TABLE 8

3GPP TS 38.212

■ SCI format 2-A
SCI format 2-A is used for the decoding of PSSCH, with HARQ operation when HARQ-ACK information includes ACK or NACK, when HARQ-ACK information includes only NACK, or when there is no feedback of HARQ-ACK information.
The following information is transmitted by means of the SCI format 2-A:
- HARQ process number - 4 bits as defined in clause 16.4 of [5, TS 38.213].
- New data indicator - 1 bit as defined in clause 16.4 of [5, TS 38.213].
- Redundancy version - 2 bits as defined in clause 16.4 of [6, TS 38.214].
- Source ID - 8 bits as defined in clause 8.1 of [6, TS 38.214].
- Destination ID - 16 bits as defined in clause 8.1 of [6, TS 38.214].
- HARQ feedback enabled/disabled indicator - 1 bit as defined in clause 16.3 of [5, TS 38.213].
- Cast type indicator - 2 bits as defined in Table 8.4.1.1-1.
- CSI request - 1 bit as defined in clause 8.2.1 of [6, TS 38.214].

■ SCI format 2-B
SCI format 2-B is used for the decoding of PSSCH, with HARQ operation when HARQ-ACK information includes only NACK, or when there is no feedback of HARQ-ACK information.
The following information is transmitted by means of the SCI format 2-B:
- HARQ process number - 4 bits as defined in clause 16.4 of [5, TS 38.213].
- New data indicator - 1 bit as defined in clause 16.4 of [5, TS 38.213].
- Redundancy version - 2 bits as defined in clause 16.4 of [6, TS 38.214].
- Source ID - 8 bits as defined in clause 8.1 of [6, TS 38.214].
- Destination ID - 16 bits as defined in clause 8.1 of [6, TS 38.214].
- HARQ feedback enabled/disabled indicator - 1 bit as defined in clause 16.3 of [5, TS 38.213].
- Zone ID - 12 bits as defined in clause 5.8.11 of [9, TS 38.331].
- Communication range requirement - 4 bits determined by higher layer parameter sl-ZoneConfigMCR-Index.

TABLE 9

| Cast type indicator | |
|---|---|
| Value of Cast type indicator | Cast type |
| 00 | Broadcast |
| 01 | Groupcast when HARQ-ACK information includes ACK or NACK |
| 10 | Unicast |
| 11 | Groupcast when HARQ-ACK information includes only NACK |

Referring to FIGS. 5A and 5B, the first UE may receive the PSFCH based on Table 10. For example, the first UE and the second UE may determine a PSFCH resource based on Table 10, and the second UE may transmit HARQ feedback to the first UE using the PSFCH resource.

TABLE 10

3GPP TS 38.213

■ UE procedure for reporting HARQ-ACK on sidelink
  A UE can be indicated by an SCI format scheduling a PSSCH reception, in one or more sub-channels from a number of $N_{subch}^{PSSCH}$ sub-channels, to transmit a PSFCH with HARQ-ACK information in response to the PSSCH reception. The UE provides HARQ-ACK information that includes ACK or NACK, or only NACK.
  A UE can be provided, by sl-PSFCH-Period, a number of slots in a resource pool for a period of PSFCH transmission occasion resources. If the number is zero, PSFCH transmissions from the UE in the resource pool are disabled.
  A UE expects that a slot ${t'}_k^{SL}$ ($0 \le k < {T'}_{max}$) has a PSFCH transmission occasion resource if k mod $N_{PSSCH}^{PSFCH} = 0$, where ${t'}_k^{SL}$ is defined in [6, TS 38.214], and ${T'}_{max}$ is a number of slots that belong to the resource pool within 10240 msec according to [6, TS 38.214], and $N_{PSSCH}^{PSFCH}$ is provided by sl-PSFCH-Period.
  A UE may be indicated by higher layers to not transmit a PSFCH in response to a PSSCH reception [11, TS 38.321].
  If a UE receives a PSSCH in a resource pool and the HARQ feedback enabled/disabled indicator field in an associated SCI format 2-A or a SCI format 2-B has value 1 [5, TS 38.212], the UE provides the HARQ-ACK information in a PSFCH transmission in the resource pool. The UE transmits the PSFCH in a first slot that includes PSFCH resources and is at least a number of slots, provided by sl-MinTimeGapPSFCH, of the resource pool after a last slot of the PSSCH reception.
  A UE is provided by sl-PSFCH-RB-Set a set of $M_{PRB, set}^{PSFCH}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N_{PSSCH}^{PSFCH}$, the UE allocates the $[(i + j \cdot N_{PSSCH}^{PSFCH}) \cdot M_{subch, slot}^{PSFCH}, (i + 1 + j \cdot N_{PSSCH}^{PSFCH}) \cdot M_{subch, slot}^{PSFCH} - 1]$ PRBs from the $M_{PRB, set}^{PSFCH}$ PRBs to slot i among
the PSSCH slots associated with the PSFCH slot and sub-channel j, where $M_{subch, slot}^{PSFCH} = M_{PRB, set}^{PSFCH}/(N_{subch} \cdot N_{PSSCH}^{PSFCH})$, $0 \le i < N_{PSSCH}^{PSFCH}$, $0 \le j < N_{subch}$, and the allocation starts in an ascending order of i and continues in an ascending order of j. The UE expects that $M_{PRB, set}^{PSFCH}$ is a multiple of $N_{subch} \cdot N_{PSSCH}^{PSFCH}$.
  The second OFDM symbol l' of PSFCH transmission in a slot is defined as l' = startSLsymbols+ lengthSLsymbols − 2.
  A UE determines a number of PSFCH resources available for multiplexing HARQ-ACK information in a PSFCH transmission as $R_{PRB, CS}^{PSFCH} = N_{type}^{PSFCH} \cdot M_{subch, slot}^{PSFCH} \cdot N_{CS}^{PSFCH}$ where $N_{CS}^{PSFCH}$ is a number of
cyclic shift pairs for the resource pool provided by sl-NumMuxCS-Pair and, based on an indication by sl-PSFCH-CandidateResourceType,
  - if sl-PSFCH-CandidateResourceType is configured as startSubCH, $N_{type}^{PSFCH} = 1$ and the $M_{subch, slot}^{PSFCH}$ PRBs are associated with the starting sub-channel of the corresponding PSSCH;
  - if sl-PSFCH-CandidateResourceType is configured as allocSubCH, $N_{type}^{PSFCH} = N_{subch}^{PSSCH}$ and the $N_{subch}^{PSSCH} \cdot M_{subch, slot}^{PSFCH}$ PRBs are associated with one or more sub-channels from the $N_{subch}^{PSSCH}$ sub-channels of the corresponding PSSCH.
  The PSFCH resources are first indexed according to an ascending order of the PRB index, from the $N_{type}^{PSFCH} \cdot M_{subch, slot}^{PSFCH}$, PRBs and then according to an ascending order of the cyclic shift pair index from the $N_{CS}^{PSFCH}$ cyclic shift pairs.
  A UE determines an index of a PSFCH resource for a PSFCH transmission in response to a PSSCH reception as $(P_{ID} + M_{ID}) \bmod R_{PRB, CS}^{PSFCH}$ where $P_{ID}$ is a physical layer source ID provided by SCI format 2-A or 2-B [5, TS 38.212] scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.
  A UE determines a $m_0$ value, for computing a value of cyclic shift α [4, TS 38.211], from a cyclic shift pair index corresponding to a PSFCH resource index and from NPSFCH using Table 11.
  A UE determines a $m_{cs}$ value, for computing a value of cyclic shift α [4, TS 38.211], as in Table 12 if the UE detects a SCI format 2-A with Cast type indicator field value of "01" or "10", or as in Table 13 if the UE detects a SCI format 2-B or a SCI format 2-A with Cast type indicator field value of "11". The UE applies one cyclic shift from a cyclic shift pair to a sequence used for the PSFCH transmission [4, TS 38.211].

TABLE 11

Set of cyclic shift pairs

| | $m_0$ | | | | | |
|---|---|---|---|---|---|---|
| $N_{CS}^{PSFCH}$ | Cyclic Shift Pair Index 0 | Cyclic Shift Pair Index 1 | Cyclic Shift Pair Index 2 | Cyclic Shift Pair Index 3 | Cyclic Shift Pair Index 4 | Cyclic Shift Pair Index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

TABLE 12

Mapping of HARQ-ACK information bit values to a cyclic shift, from a cyclic shift pair, of a sequence for a PSFCH transmission when HARQ-ACK information includes ACK or NACK

| HARQ-ACK Value | 0 (NACK) | 1 (ACK) |
|---|---|---|
| Sequence cyclic shift | 0 | 6 |

TABLE 13

Mapping of HARQ-ACK information bit values to a cyclic shift, from a cyclic shift pair, of a sequence for a PSFCH transmission when HARQ-ACK information includes only NACK

| HARQ-ACK Value | 0 (NACK) | 1 (ACK) |
|---|---|---|
| Sequence cyclic shift | 0 | N/A |

Referring to FIG. 5A, the first UE may transmit SL HARQ feedback to the base station through the PUCCH and/or the PUSCH based on Table 14.

TABLE 14

3GPP TS 38.213

UE procedure for reporting HARQ-ACK on uplink
 A UE can be provided PUCCH resources or PUSCH resources [12, TS 38.331] to report HARQ-ACK information that the UE generates based on HARQ-ACK information that the UE obtains from PSFCH receptions, or from absence of PSFCH receptions. The UE reports HARQ-ACK information on the primary cell of the PUCCH group, as described in clause 9, of the cell where the UE monitors PDCCH for detection of DCI format 3_0.
 For SL configured grant Type 1 or Type 2 PSSCH transmissions by a UE within a time period provided by sl-PeriodCG, the UE generates one HARQ-ACK information bit in response to the PSFCH receptions to multiplex in a PUCCH transmission occasion that is after a last time resource, in a set of time resources.
 For PSSCH transmissions scheduled by a DCI format 3_0, a UE generates HARQ-ACK information in response to PSFCH receptions to multiplex in a PUCCH transmission occasion that is after a last time resource in a set of time resources provided by the DCI format 3_0.
 For each PSFCH reception occasion, from a number of PSFCH reception occasions, the UE generates HARQ-ACK information to report in a PUCCH or PUSCH transmission. The UE can be indicated by a SCI format to perform one of the following and the UE constructs a HARQ-ACK codeword with HARQ-ACK information, when applicable
 - if the UE receives a PSFCH associated with a SCI format 2-A with Cast type indicator field value of "10"
 - generate HARQ-ACK information with same value as a value of HARQ-ACK information the UE determines from a PSFCH reception in the PSFCH reception occasion and, if the UE determines that a PSFCH is not received at the PSFCH reception occasion, generate NACK
 - if the UE receives a PSFCH associated with a SCI format 2-A with Cast type indicator field value of "01"
 - generate ACK if the UE determines ACK from at least one PSFCH reception occasion, from the number of PSFCH reception occasions, in PSFCH resources corresponding to every identity $M_{ID}$ of the UEs that the UE expects to receive the PSSCH, as described in clause 16.3; otherwise, generate NACK
 - if the UE receives a PSFCH associated with a SCI format 2-B or a SCI format 2-A with Cast type indicator field value of "11"
 - generate ACK when the UE determines absence of PSFCH reception for each PSFCH reception occasion from the number of PSFCH reception occasions; otherwise, generate NACK
 After a UE transmits PSSCHs and receives PSFCHs in corresponding PSFCH resource occasions, the priority value of HARQ-ACK information is same as the priority value of the PSSCH transmissions that is associated with the PSFCH reception occasions providing the HARQ-ACK information.
 The UE generates a NACK when, due to prioritization, as described in clause 16.2.4, the UE does not receive PSFCH in any PSFCH reception occasion associated with a PSSCH transmission in a resource provided by a DCI format 3_0 or, for a configured grant, in a resource provided in a single period and for which the UE is provided a PUCCH resource to report HARQ-ACK information. The priority value of the NACK is same as the priority value of the PSSCH transmission.
 The UE generates a NACK when, due to prioritization as described in clause 16.2.4, the UE does not transmit a PSSCH in any of the resources provided by a DCI format 3_0 or, for a configured grant, in any of the resources provided in a single period and for which the UE is provided a PUCCH resource to report HARQ-ACK information. The priority value of the NACK is same as the priority value of the PSSCH that was not transmitted due to prioritization.

TABLE 14-continued

3GPP TS 38.213

The UE generates an ACK if the UE does not transmit a PSCCH with a SCI format 1-A scheduling a
  PSSCH in any of the resources provided by a configured grant in a single period and for which
  the UE is provided a PUCCH resource to report HARQ-ACK information. The priority value of
  the ACK is same as the largest priority value among the possible priority values for the
  configured grant.
For reporting HARQ-ACK information on uplink corresponding to one or multiple PSSCH
  transmissions with a corresponding SCI format with the field 'HARQ feedback enabled/disabled
  indicator' set to disabled, the UE generates HARQ-ACK information with the contents instructed
  by higher layer. The priority value of the HARQ-ACK information is same as the priority value
  of the PSSCH transmission.
A UE does not expect to be provided PUCCH resources or PUSCH resources to report HARQ-ACK
  information that start earlier than $T_{prep} = (N + 1) \cdot (2048 + 144) \cdot \kappa \cdot 2^{-\mu} \cdot T_c$ after the end of a
  last symbol of a last PSFCH reception occasion, from a number of PSFCH reception occasions
  that the UE generates HARQ-ACK information to report in a PUCCH or PUSCH transmission,
  where
- $\kappa$ and $T_c$ are defined in [4, TS 38.211]
- $\mu = \min(\mu_{SL}, \mu_{UL})$, where $\mu_{SL}$ is the SCS configuration of the SL BWP and $\mu_{UL}$ is the SCS
  configuration of the active UL BWP on the primary cell
- N is determined from u according to Table 15
With reference to slots for PUCCH transmissions and for a number of PSFCH reception occasions
  ending in slot n, the UE provides the generated HARQ-ACK information in a PUCCH
  transmission within slot n + k, subject to the overlapping conditions in clause 9.2.5, where k is a
  number of slots indicated by a PSFCH-to-HARQ_feedback timing indicator field, if present, in a
  DCI format indicating a slot for PUCCH transmission to report the HARQ-ACK information, or
  k is provided by sl-PSFCH-ToPUCCH-r16 for a transmission scheduled by a DCI format or for a
  SL configured grant type 2, or by sl-PSFCH-ToPUCCH-CG-Type1 for a SL configured grant
  type 1. k = 0 corresponds to a last slot for a PUCCH transmission that would overlap with the
  last PSFCH reception occasion assuming that the start of the sidelink frame is same as the start of
  the downlink frame [4, TS 38.211].
For a PSSCH transmission by a UE that is scheduled by a DCI format, or for a SL configured grant
  Type 2 PSSCH transmission activated by a DCI format, the DCI format indicates to the UE that a
  PUCCH resource is not provided when a value of the PUCCH resource indicator field is zero and
  a value of PSFCH-to-HARQ feedback timing indicator field, if present, is zero. For a SL
  configured grant Type 2 PSSCH transmission without a corresponding PDCCH, the DCI format
  activating the SL configured grant Type 2 indicates to the UE that a PUCCH resource is not
  provided when a value of the PUCCH resource indicator field is zero and a value of PSFCH-to-
  HARQ feedback timing indicator field, if present, is zero. For a SL configured grant Type 1
  PSSCH transmission, a PUCCH resource can be provided by sl-N1PUCCH-AN and sl-PSFCH-
  ToPUCCH-CG-Type1. For transmission of HARQ-ACK information corresponding only to a SL
  configured grant Type 2 PSSCH transmission without a corresponding PDCCH, a UE can be
  provided a PUCCH resource by sl-N1PUCCH-AN-Type2. If a PUCCH resource is not provided,
  the UE does not transmit a PUCCH with generated HARQ-ACK information from PSFCH
  reception occasions.
For a PUCCH transmission with HARQ-ACK information, a UE determines a PUCCH resource after
  determining a set of PUCCH resources from up to four PUCCH resource sets provided by sl-
  PUCCH-Config-r16, for $O_{UCI}$ HARQ-ACK information bits, as described in clause 9.2.1. The
  PUCCH resource determination is based on a PUCCH resource indicator field [5, TS 38.212] in a
  last DCI format 3_0, among the DCI formats 3_0 that have a value of a PSFCH-to-
  HARQ_feedback timing indicator field indicating a same slot for the PUCCH transmission, that
  the UE detects and for which the UE transmits corresponding HARQ-ACK information in the
  PUCCH where, for PUCCH resource determination, detected DCI formats are indexed in an
  ascending order across PDCCH monitoring occasion indexes.
The PUCCH resource indicator field values map to values of a set of PUCCH resource indexes, as
  described in clause 9.2.3.
A UE transmits a PUCCH with HARQ-ACK information using PUCCH format 0 or PUCCH format
  1 or PUCCH format 2 or PUCCH format 3 or PUCCH format 4 as described in clause 9.2.3.
A UE does not expect to multiplex HARQ-ACK information for more than one SL configured grants
  in a same PUCCH.
A priority value of a PUCCH transmission with one or more sidelink HARQ-ACK information bits
  is the smallest priority value for the one or more HARQ-ACK information bits.
In the following, the CRC for DCI format 3_0 is scrambled with a SL-RNTI or a SL-CS-RNTI.

TABLE 15

| μ | N |
|---|---|
| 0 | 14 |
| 1 | 18 |
| 2 | 28 |
| 3 | 32 |

Figure 6A:
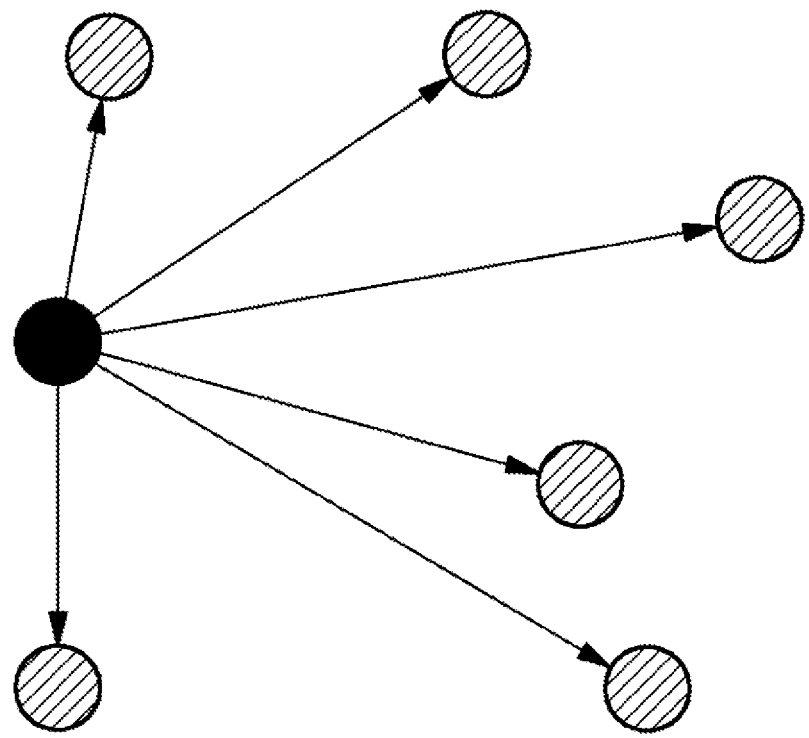
FIG. 6A to FIG. 6C illustrate 3 cast types according to an embodiment of the present disclosure.
Figure 6B:
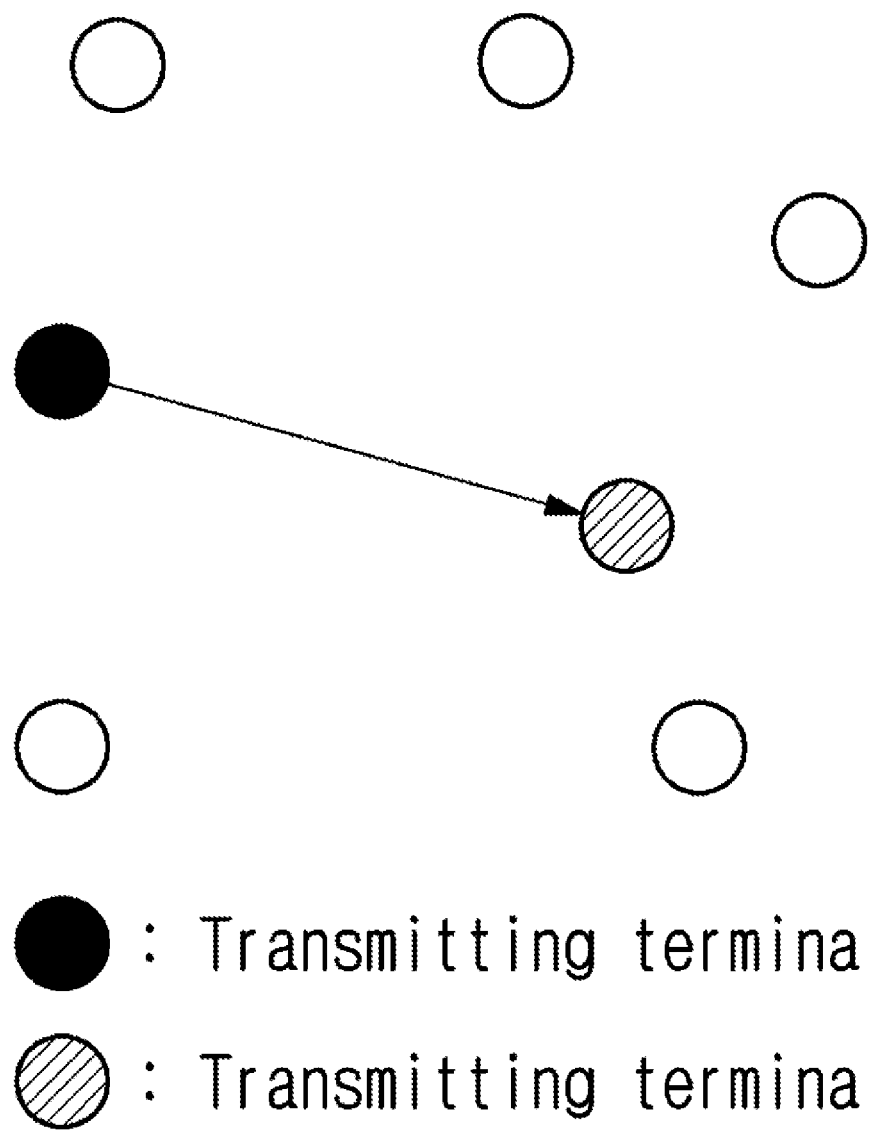
Figure 6C:
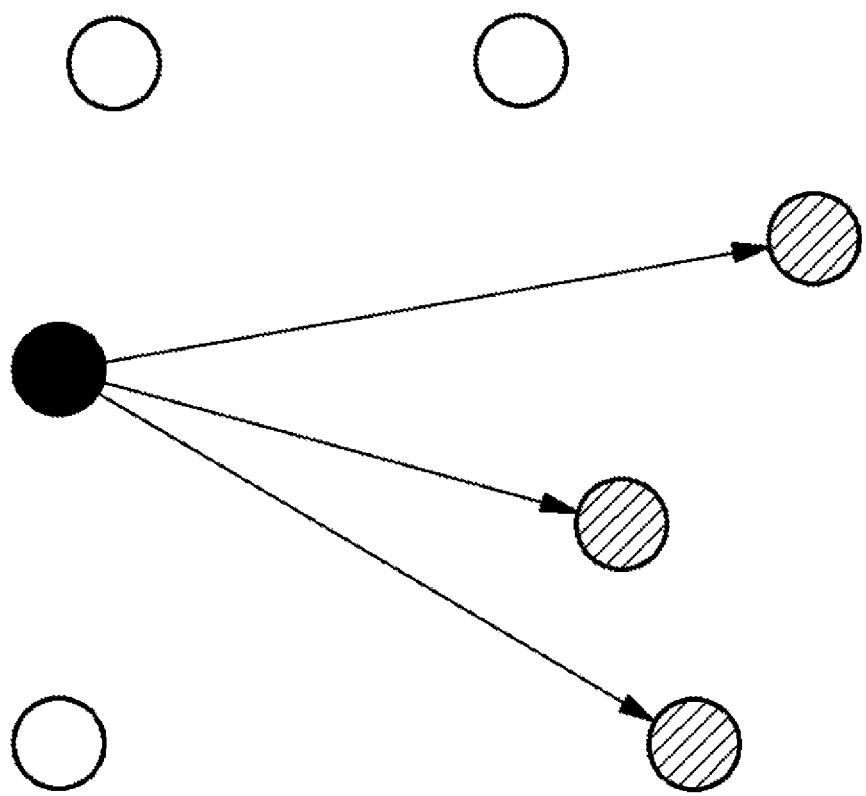

FIGS. 6A to 6C illustrate three cast types applicable to the present disclosure. The embodiment of FIGS. 6A to 6C may be combined with various embodiments of the present disclosure.

Specifically, FIG. 6A exemplifies broadcast-type SL communication, FIG. 6B exemplifies unicast type-SL communication, and FIG. 6C exemplifies groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hybrid Automatic Request (HARQ) Procedure

SL HARQ feedback may be enabled for unicast. In this case, in a non-code block group (non-CBG) operation, when the receiving UE decodes a PSCCH directed to it and succeeds in decoding an RB related to the PSCCH, the receiving UE may generate an HARQ-ACK and transmit the HARQ-ACK to the transmitting UE. On the other hand, after the receiving UE decodes the PSCCH directed to it and fails in decoding the TB related to the PSCCH, the receiving UE may generate an HARQ-NACK and transmit the HARQ-NACK to the transmitting UE.

For example, SL HARQ feedback may be enabled for groupcast. For example, in a non-CBG operation, two HARQ feedback options may be supported for groupcast.

(1) Groupcast option 1: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may not transmit an HARQ-ACK to the transmitting UE.

(2) Groupcast option 2: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may transmit an HARQ-ACK to the transmitting UE on the PSFCH.

For example, when groupcast option 1 is used for SL HARQ feedback, all UEs performing groupcast communication may share PSFCH resources. For example, UEs belonging to the same group may transmit HARQ feedbacks in the same PSFCH resources.

For example, when groupcast option 2 is used for SL HARQ feedback, each UE performing groupcast communication may use different PSFCH resources for HARQ feedback transmission. For example, UEs belonging to the same group may transmit HARQ feedbacks in different PSFCH resources.

In the present disclosure, HARQ-ACK may be referred to as ACK, ACK information, or positive-ACK information, and HARQ-NACK may be referred to as NACK, NACK information, or negative-ACK information.

SL Measurement and Reporting

For the purpose of QoS prediction, initial transmission parameter setting, link adaptation, link management, admission control, and so on, SL measurement and reporting (e.g., an RSRP or an RSRQ) between UEs may be considered in SL. For example, the receiving UE may receive an RS from the transmitting UE and measure the channel state of the transmitting UE based on the RS. Further, the receiving UE may report CSI to the transmitting UE. SL-related measurement and reporting may include measurement and reporting of a CBR and reporting of location information. Examples of CSI for V2X include a channel quality indicator (CQI), a precoding matrix index (PMI), a rank indicator (RI), an RSRP, an RSRQ, a path gain/pathloss, an SRS resource indicator (SRI), a CSI-RS resource indicator (CRI), an interference condition, a vehicle motion, and the like. CSI reporting may be activated and deactivated depending on a configuration.

For example, the transmitting UE may transmit a channel state information-reference signal (CSI-RS) to the receiving UE, and the receiving UE may measure a CQI or RI using the CSI-RS. For example, the CSI-RS may be referred to as an SL CSI-RS. For example, the CSI-RS may be confined to PSSCH transmission. For example, the transmitting UE may transmit the CSI-RS in PSSCH resources to the receiving UE.

Sidelink Congestion Control

For example, the UE may determine whether an energy measured in a unit time/frequency resource is equal to or greater than a predetermined level and control the amount and frequency of its transmission resources according to the ratio of unit time/frequency resources in which the energy equal to or greater than the predetermined level is observed. In the present disclosure, a ratio of time/frequency resources in which an energy equal to or greater than a predetermined level is observed may be defined as a CBR. The UE may measure a CBR for a channel/frequency. In addition, the UE may transmit the measured CBR to the network/BS.

Figure 7:
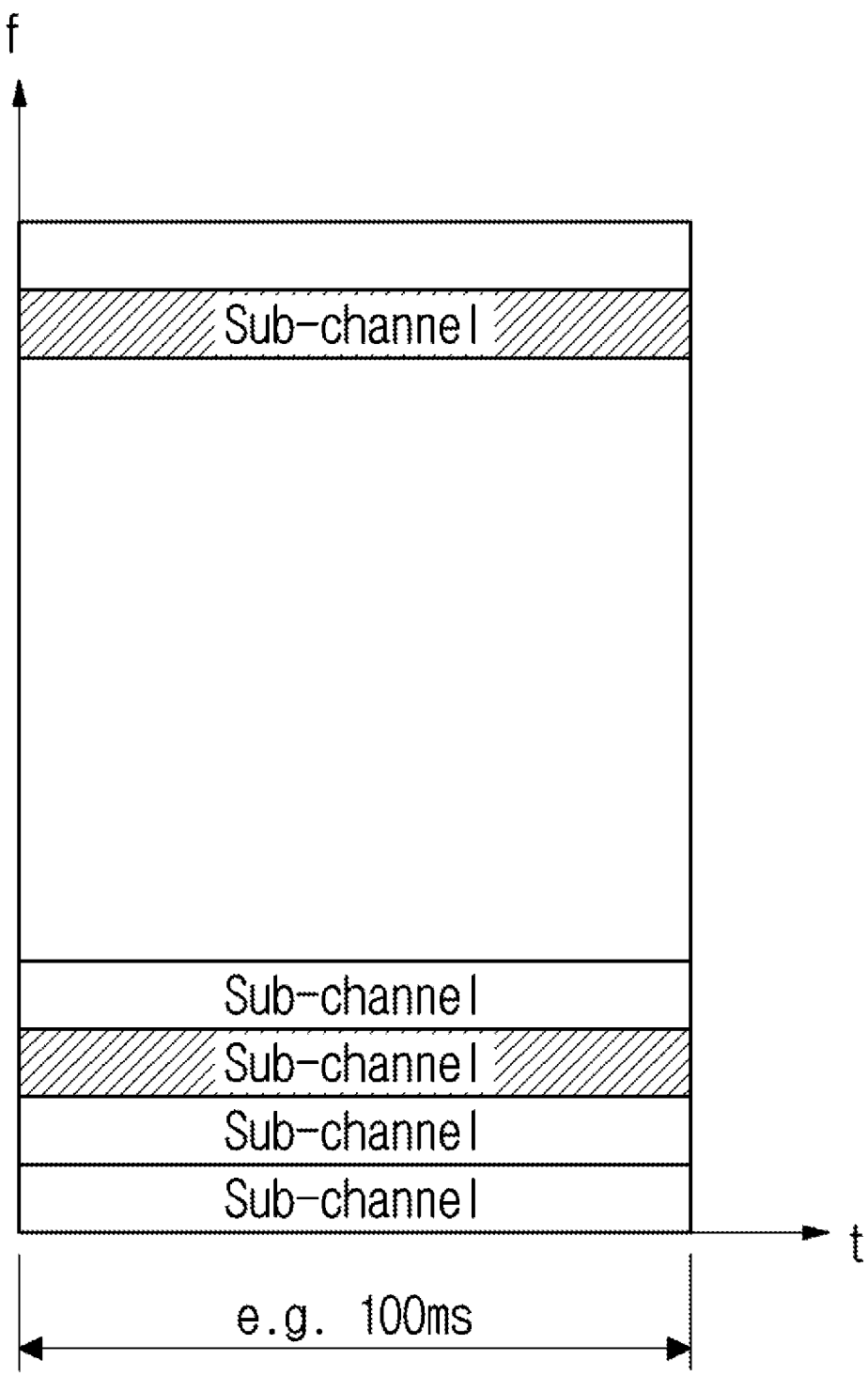
FIG. 7 illustrates a resource unit for CBR measurement according to an embodiment of the present disclosure.

FIG. 7 illustrates resource units for CBR measurement applicable to the present disclosure. The embodiment of FIG. 7 may be combined with various embodiments of the present disclosure.

Referring to FIG. 7, a CBR may refer to the number of subchannels of which the RSSI measurements are equal to or larger than a predetermined threshold as a result of measuring an RSSI in each subchannel during a specific period (e.g., 100 ms) by a UE. Alternatively, a CBR may refer to a ratio of subchannels having values equal to or greater than a predetermined threshold among subchannels during a specific period. For example, in the embodiment of FIG. 7, on the assumption that the hatched subchannels have values greater than or equal to a predetermined threshold, the CBR may refer to a ratio of hatched subchannels for a time period of 100 ms. In addition, the UE may report the CBR to the BS.

For example, when a PSCCH and a PSSCH are multiplexed in a frequency domain, the UE may perform one CBR measurement in one resource pool. When PSFCH resources are configured or preconfigured, the PSFCH resources may be excluded from the CBR measurement.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (MCS coordination), or the like.

An example of SL CBR and SL RSSI is as follows. In the description below, the slot index may be based on a physical slot index.

A SL CBR measured in slot n is defined as the portion of sub-channels in the resource pool whose SL RSSI measured by the UE exceed a (pre-)configured threshold sensed over a CBR measurement window [n−a, n−1]. Herein, a is equal to 100 or 100·2μ slots, according to higher layer parameter sl-TimeWindowSizeCBR. The SL CBR is applicable for RRC_IDLE intra-frequency, RRC_IDLE inter-frequency, RRC_CONNECTED intra-frequency, or RRC_CONNECTED inter-frequency A SL RSSI is defined as the linear average of the total received power (in [W]) observed in the configured sub-channel in OFDM symbols of a slot configured for PSCCH and PSSCH, starting from the 2nd OFDM symbol. For frequency range 1, the reference point for the SL RSSI shall be the antenna connector of the UE. For frequency range 2, SL RSSI shall be measured based on the combined signal from antenna elements corresponding to a given receiver branch. For frequency range 1 and 2, if receiver diversity is in use by the UE, the reported SL RSSI value shall not be lower than the corresponding SL RSSI of any of the individual receiver branches. The SL RSSI is applicable for RRC_IDLE intra-frequency, RRC_IDLE inter-frequency, RRC_CONNECTED intra-frequency or RRC_CONNECTED inter-frequency.

An example of an SL (Channel occupancy Ratio) is as follows. The SL CR evaluated at slot n is defined as the total number of sub-channels used for its transmissions in slots [n−a, n−1] and granted in slots [n, n+b] divided by the total number of configured sub-channels in the transmission pool over [n−a, n+b]. The SL CR is applicable for RRC_IDLE intra-frequency, RRC_IDLE inter-frequency, RRC_CONNECTED intra-frequency or RRC_CONNECTED inter-frequency. Herein, a may be a positive integer and b may be 0 or a positive integer. a and b may be determined by UE implementation with a+b+1=1000 or 1000·2μ slots, according to higher layer parameter sl-TimeWindowSizeCR, b<(a+b+1)/2, and n+b shall not exceed the last transmission opportunity of the grant for the current transmission. The SL CR is evaluated for each (re)transmission. In evaluating SL CR, the UE shall assume the transmission parameter used at slot n is reused according to the existing grant(s) in slot [n+1, n+b] without packet dropping. The slot index is based on physical slot index. The SL CR can be computed per priority level. A resource is considered granted if it is a member of a selected sidelink grant as defined in TS 38.321.

Positioning

Figure 8:
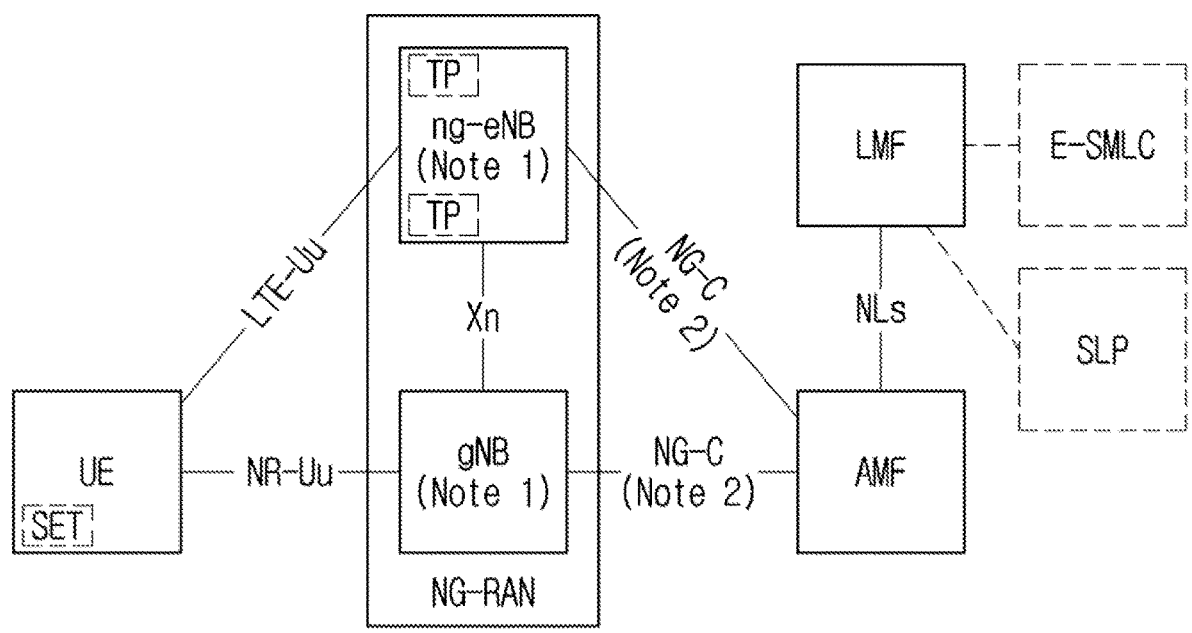
FIG. 8 illustrates an example of an architecture in a 5G system, in which positioning is possible for a UE connected with a next generation-radio access network (NR-RAN) or E-UTRAN, according to an embodiment of the present disclosure.

FIG. 8 illustrates an example of an architecture of a 5G system capable of positioning a UE connected to an NG-RAN or an E-UTRAN applicable to the present disclosure.

Referring to FIG. 8, an AMF may receive a request for a location service related to a specific target UE from another entity such as a gateway mobile location center (GMLC) or may autonomously determine to initiate the location service on behalf of the specific target UE. The AMF may then transmit a location service request to a location management function (LMF). Upon receipt of the location service request, the LMF may process the location service request and return a processing result including information about an estimated location of the UE to the AMF. On the other hand, when the location service request is received from another entity such as the GMLC, the AMF may deliver the processing result received from the LMF to the other entity.

A new generation evolved-NB (ng-eNB) and a gNB, which are network elements of an NG-RAN capable of providing measurement results for positioning, may measure radio signals for the target UE and transmit result values to the LMF. The ng-eNB may also control some transmission points (TPs) such as remote radio heads or positioning reference signal (PRS)-dedicated TPs supporting a PRS-based beacon system for an E-UTRA.

The LMF is connected to an enhanced serving mobile location center (E-SMLC), and the E-SMLC may enable the LMF to access an E-UTRAN. For example, the E-SMLC may enable the LMF to support observed time difference of arrival (OTDOA), which is one of positioning methods in the E-UTRAN, by using DL measurements obtained by the target UE through signals transmitted by the eNB and/or the PRS-dedicated TPs in the E-UTRAN.

The LMF may be connected to an SUPL location platform (SLP). The LMF may support and manage different location determination services for target UEs. The LMF may interact with the serving ng-eNB or serving gNB of a target UE to obtain a location measurement of the UE. For positioning the target UE, the LMF may determine a positioning method based on a location service (LCS) client type, a QoS requirement, UE positioning capabilities, gNB positioning capabilities, and ng-eNB positioning capabilities, and apply the positioning method to the serving gNB and/or the serving ng-eNB. The LMF may determine additional information such as a location estimate for the target UE and the accuracy of the position estimation and a speed. The SLP is a secure user plane location (SUPL) entity responsible for positioning through the user plane.

The UE may measure a DL signal through sources such as the NG-RAN and E-UTRAN, different global navigation satellite systems (GNSSes), a terrestrial beacon system (TBS), a wireless local area network (WLAN) access point, a Bluetooth beacon, and a UE barometric pressure sensor. The UE may include an LCS application and access the LCS application through communication with a network to which the UE is connected or through another application included in the UE. The LCS application may include a measurement and calculation function required to determine the location of the UE. For example, the UE may include an independent positioning function such as a global positioning system (GPS) and report the location of the UE independently of an NG-RAN transmission. The independently obtained positioning information may be utilized as auxiliary information of positioning information obtained from the network.

Concrete Embodiment of the Present Disclosure

Figure 9:
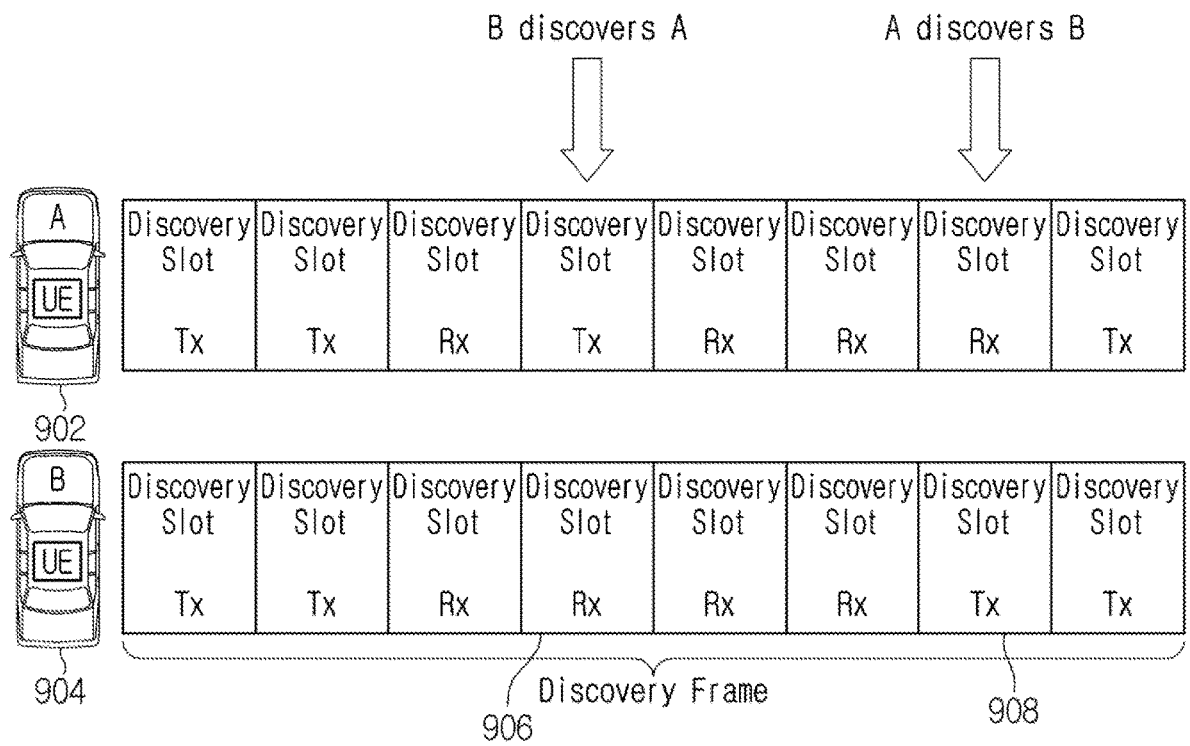
FIG. 9 illustrates a discovery signal allocation method that is applicable to the present disclosure.

FIG. 9 illustrates a discovery signal allocation method that is applicable to the present disclosure. Referring to FIG. 9, a discovery signal may be transmitted (Tx) or received (Rx). A discovery signal may be randomly placed for each terminal at each slot. As an example, a terminal A 902 may place a discovery signal at each slot in an order of Tx, Tx, Rx, Tx, Rx, Rx, Rx and Tx. A terminal B 904 may place a discovery signal at each slot in an order of Tx, Tx, Rx, Rx, Rx, Rx, Tx and Tx. Accordingly, at a slot 906 where the terminal A 902 transmits a discovery signal and the terminal B 904 receives a discovery signal, the terminal B 904 may find the terminal A 902. In addition, at a slot 908 where the terminal A 902 receives a discovery signal and the terminal B 904 transmits a discovery signal, the terminal A 902 may find the terminal B 904. Thus, a discovery operation may end. The above-described content describes a series of processes of transmitting a discovery signal from the perspective of one terminal. The terminals of FIG. 9 randomly map Tx and Rx. Random mapping may cause many collisions of discovery signals. Accordingly, there may be a problem that communication is down during a discovery frame.

To communicate with a counterpart, mmWave V2X communication should recognize the counterpart first. That is, beam alignment should be made first between communication objects. A discovery procedure is required for beam alignment. To implement a discovery procedure, a discovery signal needs to be transmitted. When terminals transmit a discovery signal at any time, other terminals should always make an attempt to receive the discovery signal. Even when other terminals make no attempt to receive a discovery signal, if beam sweeping does not match well between terminals, a lot of time may be required for detecting each other. In addition, when a terminal transmits a discovery signal at any time, it may interfere with data transmission between other terminals. Accordingly, it may be reasonable that there is a separate discovery region. Herein, it is necessary to configure an appropriate discovery region. It is because, as a discovery region becomes larger, a data region is reduced. Meanwhile, a discovery region may have a half duplexing problem that transmission and reception between vehicles cannot be performed simultaneously. The embodiments of the present disclosure are applicable to terminals and other wireless devices and are not limited to vehicles. Hereinafter, the terms 'terminal" and "vehicle" may be used interchangeably.

A terminal may end a discovery operation only when transmission and reception with another terminal are performed at least once respectively during a discovery frame. It is because transmission and reception between vehicles cannot be performed simultaneously at an mmWave V2X communication discovery step. The present disclosure proposes a discovery zone ID using a zone ID. A discovery zone ID may be set by considering a size of a terminal. As an example, a discovery zone ID may be set to m5. That is, a vehicle may implement a discovery procedure based on an m5 zone ID similar to a size of vehicle. Each vehicle may have a different discovery zone ID by using an m5 discovery zone ID similar to a size of the vehicle. However, the present disclosure is not limited to the above-described embodiment, and there may be various sizes of discovery zone IDs. A vehicle may make a discovery slot based mapping set, which considers a location of each vehicle in a discovery frame, by using a discovery zone ID.

The present disclosure proposes a shift value for minimizing discovery signal collision. In addition, the present disclosure proposes a method of making a discovery slot based mapping set by shifting Tx and Rx slots.

Figure 10:
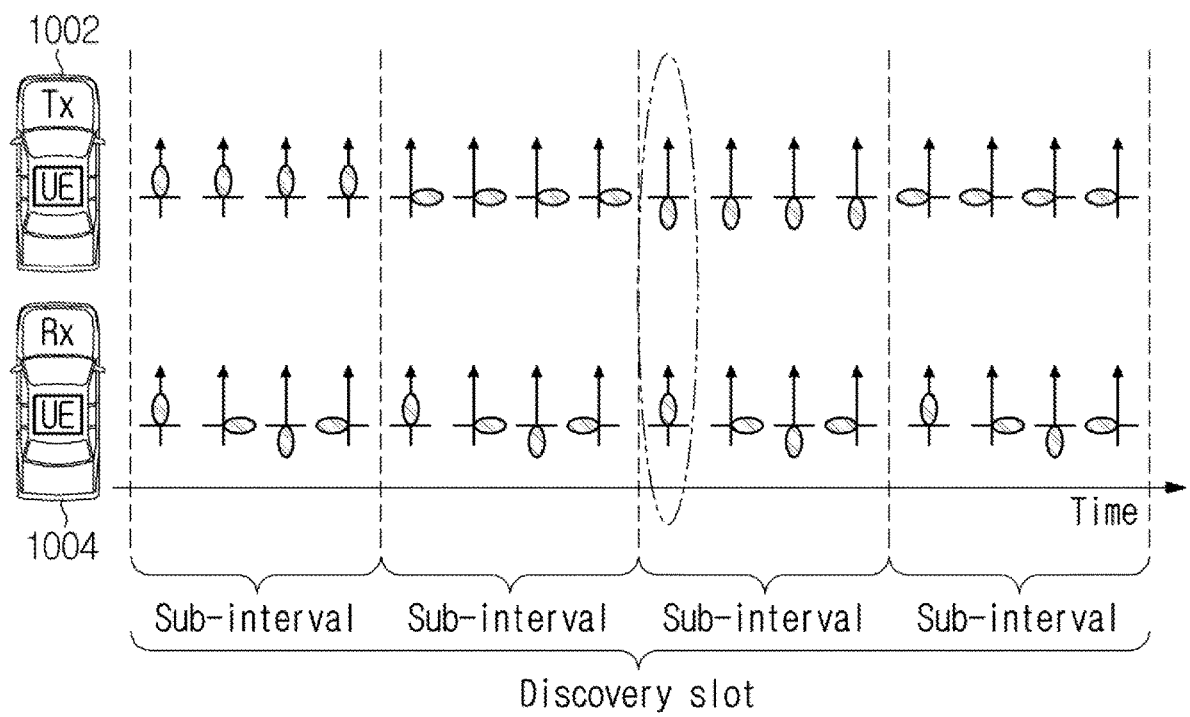
FIG. 10 is a view illustrating a beam sweep pattern that is applicable to the present disclosure.

FIG. 10 is a view illustrating a beam sweep pattern that is applicable to the present disclosure. Referring to FIG. 10, a terminal 1002 may transmit a discovery signal. A terminal 1004 may receive a discovery signal. The terminal 1002 has 4 beam sweep patterns of up, down, left and right. The terminal 1004 also has 4 beam sweep patterns. On the other hand, the present disclosure may propose a beam sweep pattern for a case in which vehicles have different numbers of beams.

Figure 11:
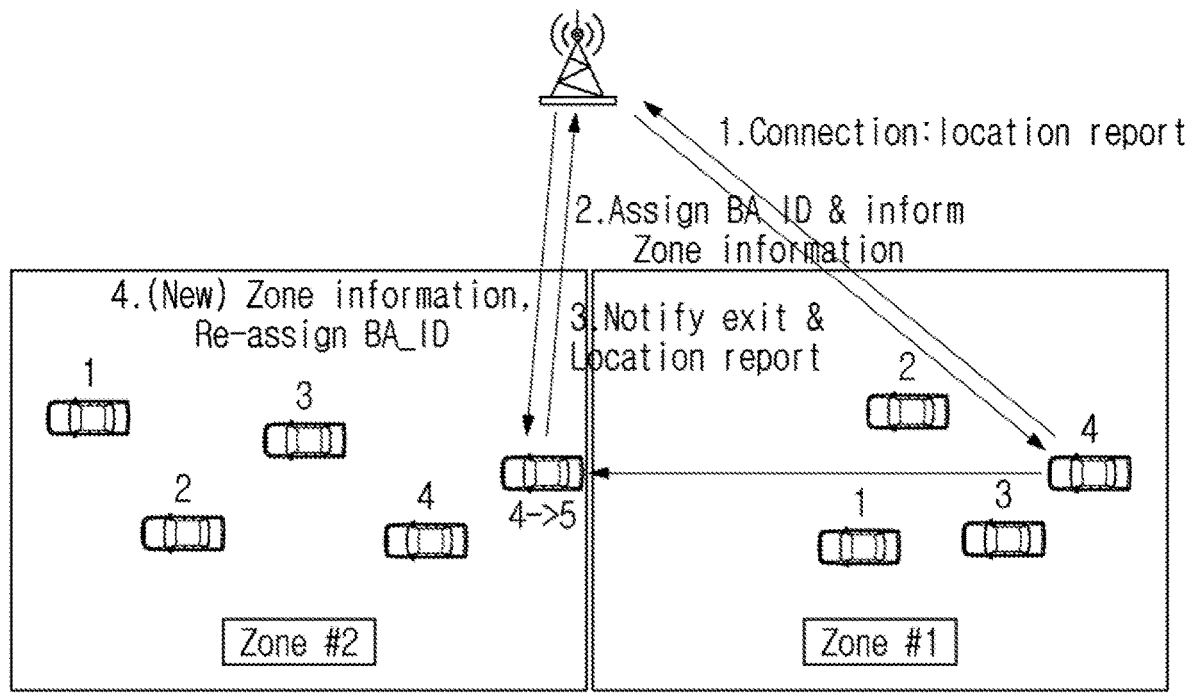
FIG. 11 is a view illustrating a method for assigning a beam acquisition ID.

FIG. 11 is a view illustrating a method for assigning a beam acquisition ID. Referring FIG. 11, a base station manages a beam acquisition ID for each zone. Accordingly, there is a consequential problem that a base station plays a heavy role. In addition, a problem may occur when a vehicle starts outside coverage or gets out of coverage while running. The present disclosure proposes a method for minimizing the role of a base station. In addition, the present disclosure proposes a method for enabling a terminal to minimize the half duplex problem of a synchronization signal without a base station. In addition, the present disclosure proposes a communication method for a case in which a vehicle starts outside coverage or gets out of coverage while running.

Figure 12:
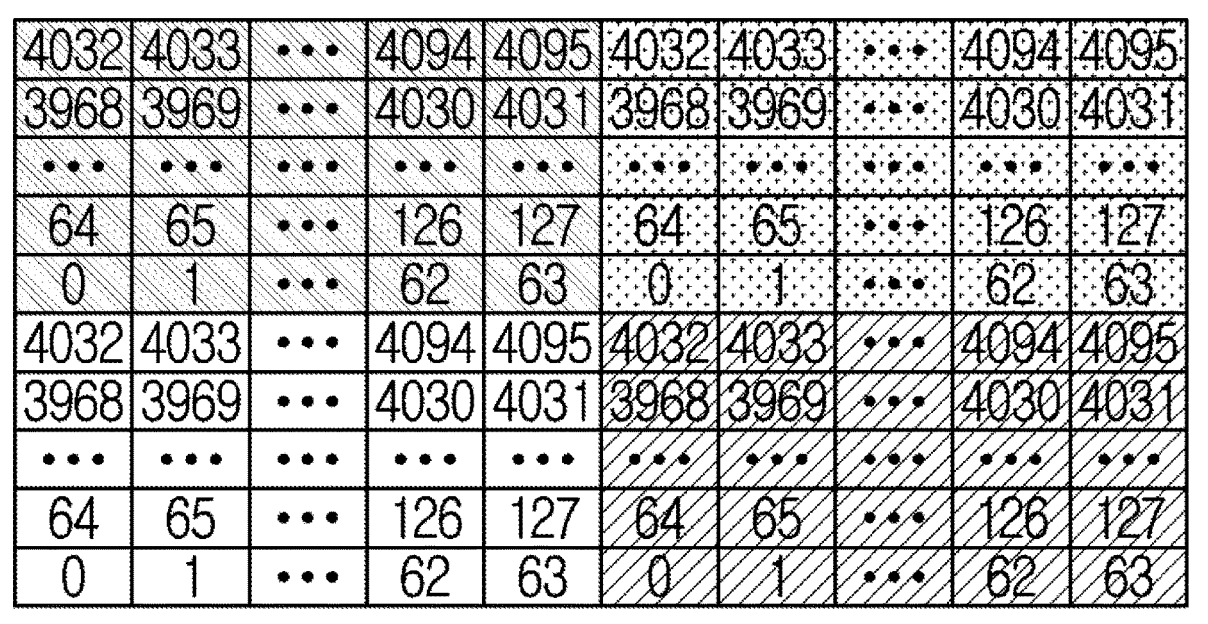

FIG. 12 is a view illustrating an example of a zone ID that is applicable to the present disclosure. 3GPP TS 38.331 (5.8.11) discloses calculation of a zone ID. Referring to FIG. 12, a zone ID may be divided into regions with a predetermined area based on an origin. Referring to FIG. 12, a zone ID may be divided into 4 regions based on an origin. Within the region, the zone ID may further be divided into 4095 (64*64) regions. A region indicated by Zone id 0 to Zone id 4095 may form a single zone. A single zone may be referred to as a block. Table 16 below shows an example of zone identity calculation.

TABLE 16

| 3GPP TS 38.331 |
| --- |
| 5.8.11 <Zone identity calculation> The UE shall determine an identity of the zone (i.e. Zone_id) in which it is located using the following formulae, if sl-ZoneConfig is configured:     x1= Floor (x / L) Mod 64;     y1= Floor (y / W) Mod 64;     Zone_id = y1 * 64 + x1 The parameters in the formulae are defined as follows: L and W are the same value of sl-ZoneLength included in sl-ZoneConfig;     sl-ZoneLength-r16 ENUMERATED { m5, m10, m20, m30, m40, m50, spare1, spare2} x is the geodesic distance in longitude between UE's current location and geographical coordinates (0, 0) according to WGS84 model and it is expressed in meters; y is the geodesic distance in latitude between UE's current location and geographical coordinates (0, 0) according to WGS84 model and it is expressed in meters. |

The present disclosure proposes a discovery zone ID using a zone ID. A discovery zone ID may be set by considering a size of a terminal. As an example, a discovery zone ID, which is applicable to the present disclosure, may be set to m5 by considering a size of a vehicle. That is, in ENUMERATED {m5, m10, m20, m30, m40, m50, spare1, spare2}, m5 may be selected. Accordingly, a discovery zone ID may be set by a size of a vehicle. In addition, zone IDs of respective vehicles may be set to be different from each other. A terminal may make a discovery slot based mapping set, which considers a location of each device in a discovery frame, by using a discovery zone ID.

Figure 13:
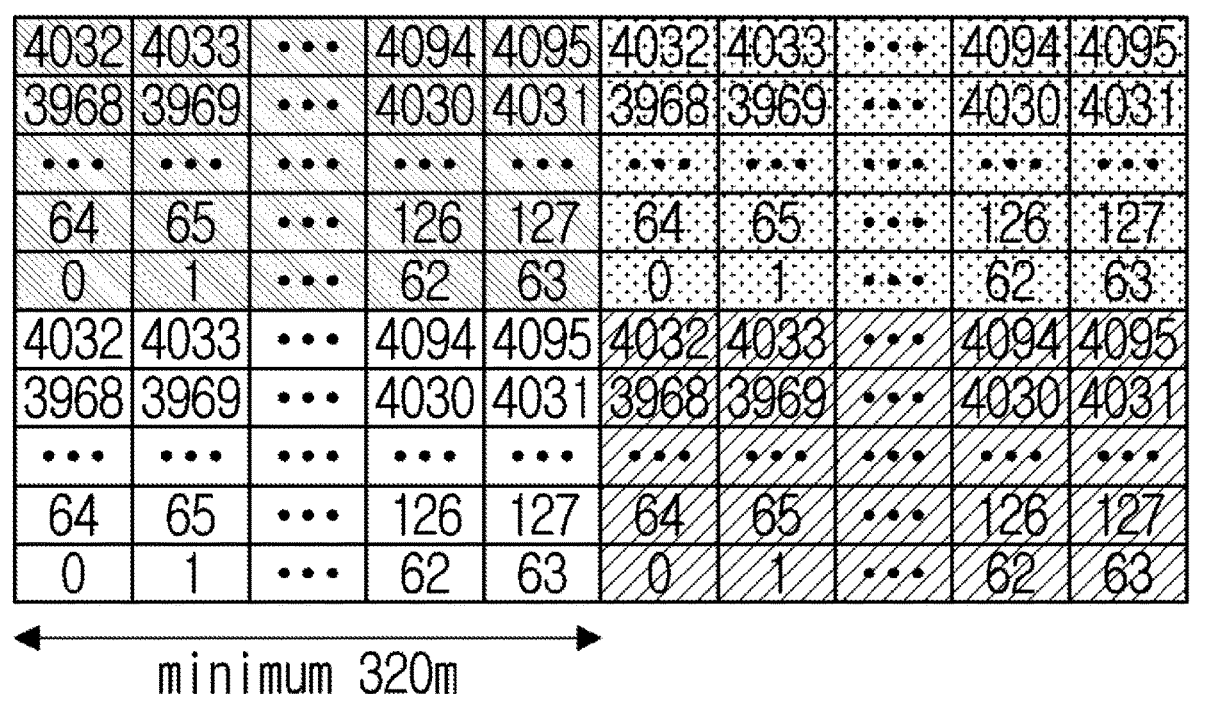

FIG. 13 is a view illustrating an example of a zone ID that is applicable to the present disclosure. Referring to FIG. 13, a zone ID may be divided into 4 regions. A zone ID, which is applicable to the present disclosure, may be set to m5. When a zone ID is set to m5, one side of a block may be 320 m (64*5 m). Referring to FIG. 13, there are 4 blocks with one side as long as 320 m. The present disclosure proposes a method of using a zone ID as a factor for determining a synchronization signal time. Even when there is no intervention of a base station, a terminal may determine a zone ID. As an example, a terminal may receive information on its location based on the global navigation satellite system (GNSS). As another example, a terminal may receive information on its location from a base station.

A terminal may calculate a zone ID based on information on its location. As an example, a terminal may determine a zone ID based on GNSS. As yet another example, a terminal may calculate a zone ID based on information on its location, which is received from a base station. A terminal may determine a synchronization signal time based on a zone ID. A terminal may select a size of a zone ID by considering a terminal size. As an example, a vehicle may select a zone ID of m5 and determine a synchronization signal transmission time based on such a zone ID. As yet another example, in case a same zone ID is assigned to a plurality of vehicles, vehicles to which a same zone ID is assigned may be preconfigured by using one of spares, when receiving an initial synchronization signal. Herein, a spare may be disclosed in spec.

Figure 14:
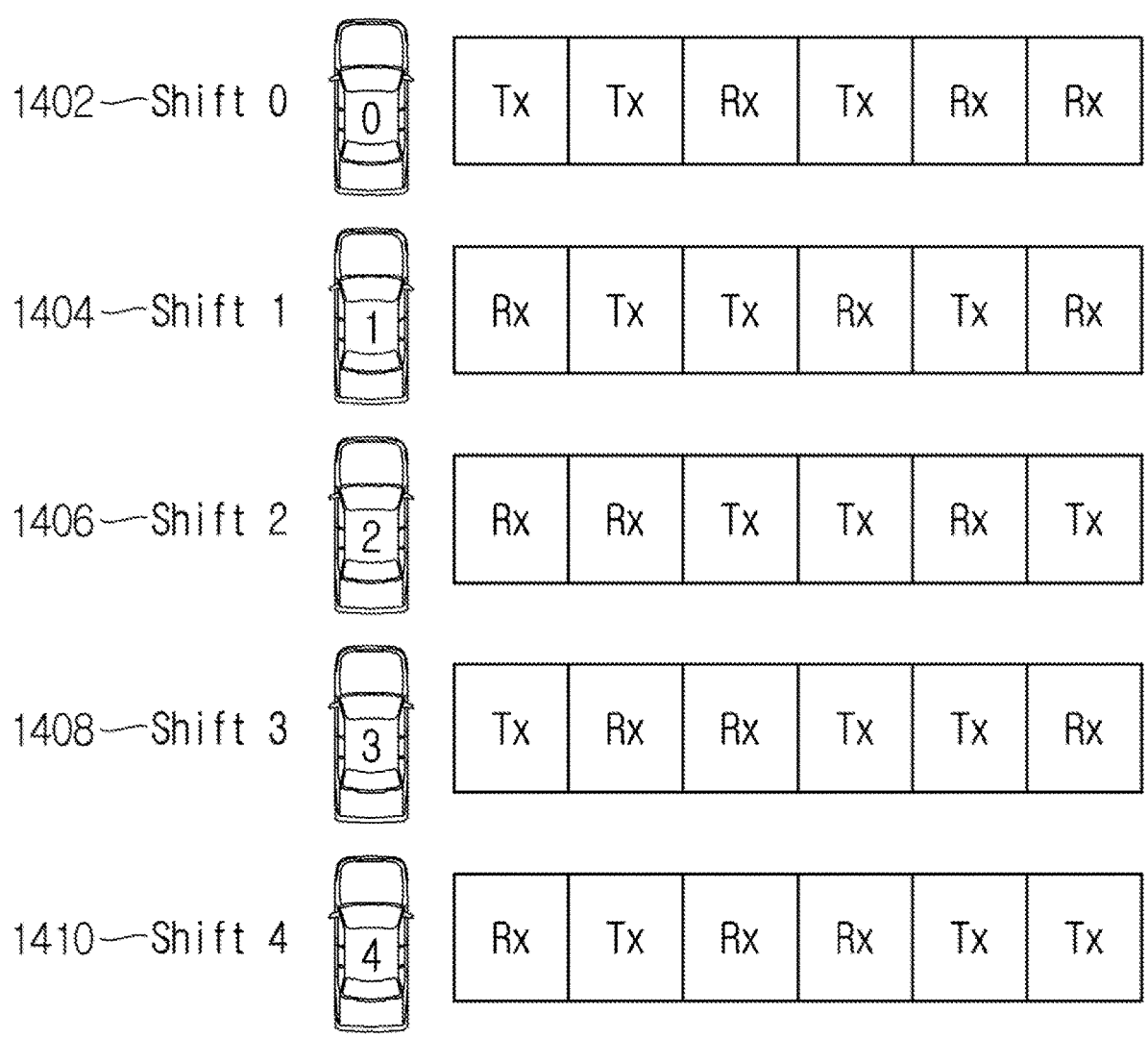
FIG. 14 is a view illustrating an example of shift discovery that is applicable to the present disclosure.

FIG. 14 is a view illustrating an example of shift discovery that is applicable to the present disclosure. The present disclosure proposes a method of using shift according to a location of a terminal in order to minimize discovery signal collision.

In the case of a sidelink in V2X, data communication may be possible when a transmission time and a reception time agree with each other between a data reception terminal and a data transmission terminal. A reception terminal cannot know when a transmission terminal transmits data. Accordingly, a reception terminal may always try to receive in an interval that is not its transmission time. That is, a reception terminal may have communication by trying to receive all the time in an interval where reception is possible. However, in case a terminal uses a mmWave beam, even when transmission and reception times agree with each other, communication may not be possible according to a direction of the beam. Accordingly, in case terminals use a sidelink in mmWave V2X communication, each of the terminals should recognize its counterpart first in order to communicate with the counterpart. To recognize each other, terminals should match transmission and reception beam directions to a certain extent. Such a step may be defined as a discovery step. In a mmWave V2X communication discovery step, transmission and reception between terminals cannot be performed simultaneously. Accordingly, a vehicle may end a discovery operation only when transmission and reception with another terminal are performed at least once respectively during a discovery frame. A terminal may generate a shift value by using a value in consideration of a location of the terminal.

As an example, a terminal may make a shift discovery value by using an existing zone ID. This will be described in detail below.

Shift_discovery=Discovery Zone id mod Nslot

Nslot may means the number of slots present in a discovery frame. Discovery Zone id may mean a zone ID used in a discovery step. As an example, each terminal may generate shift 0 1402, shift 1 1404, shift 2 1406, shift 3 1408 and shift 4 1410 respectively by considering its location and size. A shift value, a discovery shift value, and a shift discovery value may be used interchangeably. Each terminal may use a shift value for Tx and Rx mapping in a discovery frame. As an example, a terminal may use a random pattern, a hopping pattern, or a specific pattern to make a discovery slot based mapping set to which a shift discovery value is applied. As another example, a terminal may generate a shift discovery value by using a value capable of measuring a location, instead of a discovery zone ID.

The above-described discovery procedure based on a discovery slot based mapping set may reduce collision of a discovery signal better than random mapping. Hereinafter, Table 17 shows an experimental result associated with the present disclosure.

TABLE 17

| Simulation |
| --- |
| Simulation variables |
| Number of neighboring cars – Ncar |
| Number of slots in Discovery Frame – Nslot |
| Error A,B – Average value of car not completing operation during Discovery Frame |
| Simulation Results (Monte Carlo Simulation) |
| Ncar – 4, Nslot – 4 Error A = 0.4849, Error B = 0.3708 |
| Ncar – 8, Nslot – 4 Error A = 0.3990, Error B = 0.3413 |
| Ncar – 16, Nslot – 4 Error A = 0.3605, Error B = 0.3426 |
| Ncar – 32, Nslot – 4 Error A = 0.3359, Error B = 0.3215 |
| Ncar – 6, Nslot – 6 Error A = 0.3152, Error B = 0.2178 |
| Ncar – 12, Nslot – 6 Error A = 0.2480, Error B = 0.2015 |
| Ncar – 24, Nslot – 6 Error A = 0.2127, Error B = 0.1885 |
| Ncar – 8, Nslot – 8 Error A = 0.2120, Error B = 0.1397 |
| Ncar – 16, Nslot – 8 Error A = 0.1562, Error B = 0.1215 |
| Ncar – 32, Nslot – 8 Error A = 0.1277, Error B = 0.1084 |

In every experiment, an experimental result of the present disclosure shows 1 to 11% improvement as compared with random mapping. Depending on cases, higher improvement may be achieved, and the present disclosure is not limited to the above-described embodiment and improvements.

Figure 15:
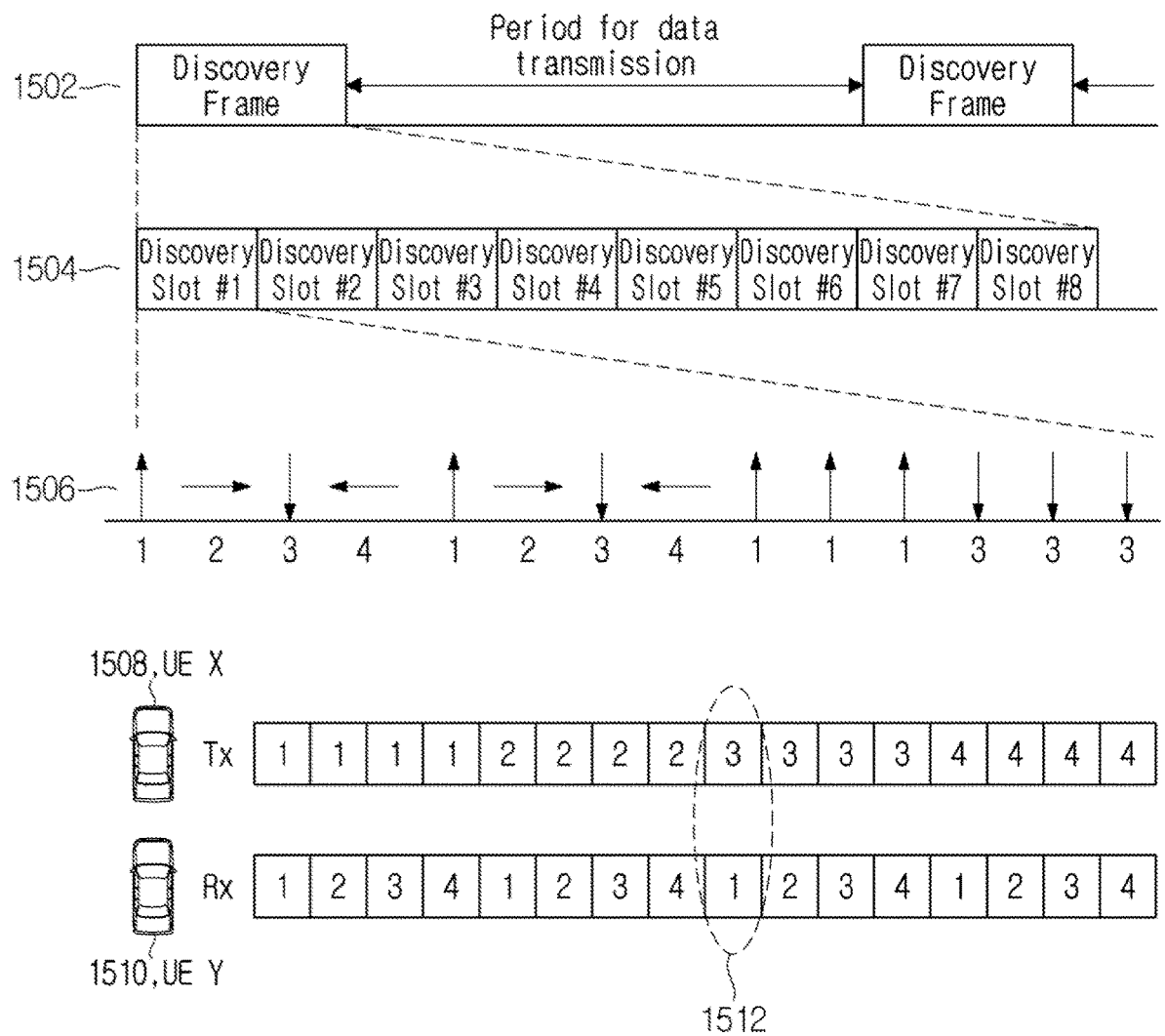
FIG. 15 is a view illustrating an example of a discovery frame that is applicable to the present disclosure.

FIG. 15 is a view illustrating an example of a discovery frame that is applicable to the present disclosure. Referring to FIG. 15, a discovery frame 1502 may include a plurality of discovery slots 1504. During a discovery slot, a terminal may perform a Tx or Rx operation. The discovery frame 1502 may be periodically transmitted.

In a discovery slot, a terminal may perform a beam sweep operation. As an example, a terminal may select a beam sweep pattern and perform a beam sweep based on such selection. In the description of FIG. 15, numbers correspond to beam directions. As an example, the beam directions 1506 may have 4 directions. Referring to FIG. 15, an upward direction may be called a beam 1, a right direction may be called a beam 2, a downward direction may be called a beam 3, and a left direction may be called a beam 4. The drawings below may also be described by numbering beam directions. The lower part of FIG. 15 shows a beam sweep operation between a terminal X 1508 and a terminal Y 1510. In case the terminal X 1508 and the terminal Y 1510 have a same number of beams, the terminal X 1508 in Tx mode may transmit a single beam repeatedly as many times as the number of beams to the terminal Y 1510 in Rx mode. As an example, when both the terminal X 1508 and the terminal Y 1510 have 4 beams, the terminal X 1508 may transmit the beams 1 to 4 four times respectively to the terminal Y 1510. In this case, the terminal X 1508 may find a best beam by performing beam sweep 16 times. Referring to FIG. 15, in case the terminal X transmits a beam in the direction 3 and the terminal Y receives a beam in the direction 1 (1512), since the terminal X is in an upper position and the terminal Y is in a lower position, discovery signal communication may be performed. When the slots of the terminal X 1508 and the terminal Y 1510 are changed, the terminal X may be in Rx mode and the terminal Y may be in Tx mode. In this case, a beam sweep may be performed in the above-described method.

Figure 16:
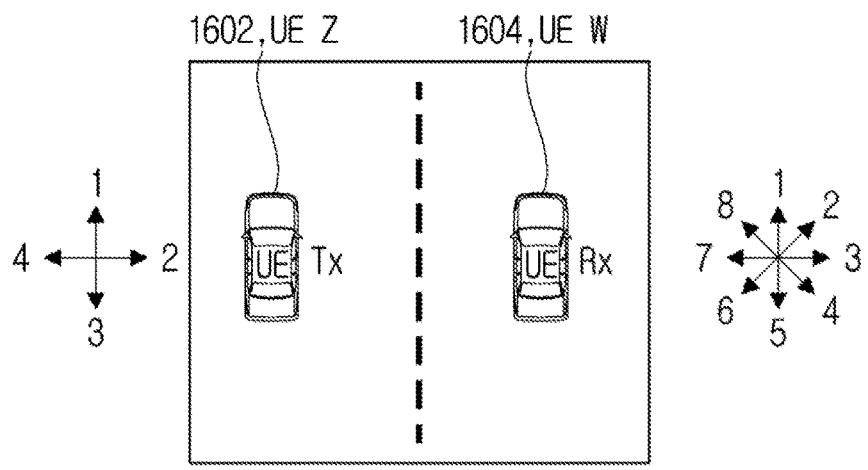
FIG. 16 is a view illustrating an example of a method for determining a beam sweep pattern in case there is a difference in the number of beams between vehicles, which is applicable to the present disclosure.
Figure 16:
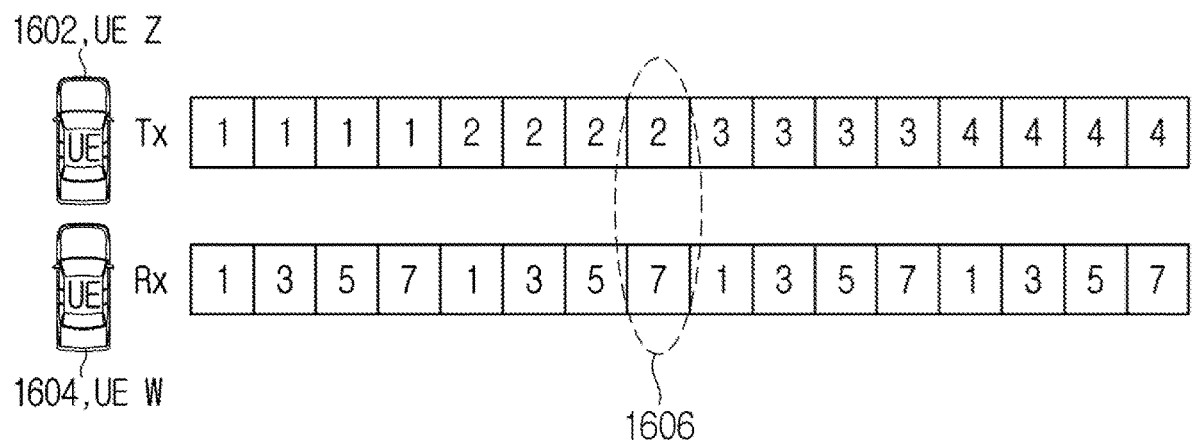

FIG. 16 is a view illustrating an example of a method for determining a beam sweep pattern in case there is a difference in the number of beams between vehicles, which is applicable to the present disclosure. A vehicle may have at least 4 antennas. That is, a vehicle may have at least 4 beam directions. A vehicle may have at least left/right and forward/backward beam directions of the vehicle. Such an antenna of a vehicle may be pre-configured through a spec.

When a terminal has more beam directions, it may not sweep all the beam directions but only some of the beam directions. As an example, when a terminal has more beam directions, it may sweep some of the beam directions by adjusting a width of a beam. As an example, when a terminal has more beam directions, it may sweep as many directions as the number of beams of a terminal which has a smaller number of beam directions. As an example, when a terminal with 4 beams directions and a terminal with 8 beam directions are located side by side, the terminal with 8 beam directions may sweep only 4 directions of left, right, forward and backward. As another example, when a terminal with 4 beams directions and a terminal with 8 beam directions are located up and down, the terminal with 8 beam directions may sweep only 4 directions of left, right, forward and backward.

Referring to FIG. 16, a terminal Z 1602 has beams in 4 directions. A terminal W 1604 has beams in 8 directions. Referring to FIG. 16, the terminal Z 1602 is located on the left side of a road. The terminal W 1604 is located on the right side of the road. That is, the terminal Z 1602 and the terminal W 1604 are located side by side.

As an example, the terminal W 1604 may not sweep all the beams in 8 directions but sweep only some of them. As an example, the terminal W 1604, which has more beam directions than the terminal Z 1602, may not sweep all the 8 directions but sweep only 4 directions. In addition, referring to FIG. 16, the terminal W 1604 may sweep only for beams in directions 1, 3, 5 and 7 by adjusting width. As an example, the terminal W 1604 may sweep by increasing a width of beams in directions 1, 3, 5 and 7. Referring to FIG. 16, as the terminal Z sweeps beams in directions 1, 2, 3 and 4 and then transmits a beam in the direction 2 and the terminal W sweeps by increasing a width of beam in the directions 1, 3, 5 and 7 and then receives a beam in the direction 7, discovery communication may be performed (1606).

Figure 17:
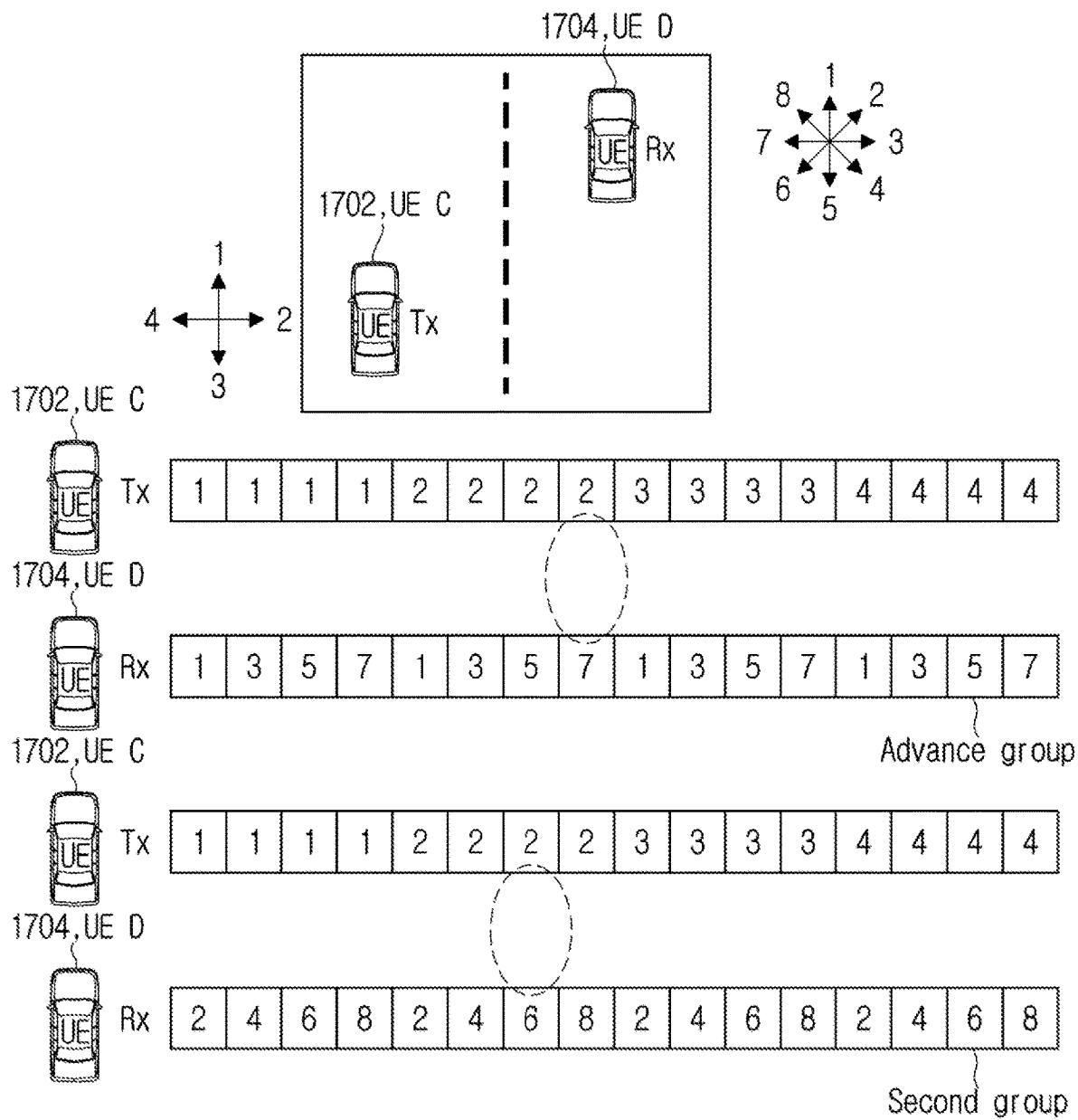
FIG. 17 illustrates a method for determining a beam sweep pattern based on beam grouping that is applicable to the present disclosure.

FIG. 17 illustrates a method for determining a beam sweep pattern based on beam grouping that is applicable to the present disclosure. In case a terminal with a larger number of beams tries discovery by sweeping only for a beam group in some directions but fails, it may try discovery by sweeping for a beam group in an unattempted direction. The sweep for the beam group in the unattempted direction may be performed in a next slot. In addition, in case two terminals with different numbers of beam directions are present diagonally, a terminal with a larger number of beam directions may divide the directions of beams into groups. In addition, when the terminal with a larger number of beams cannot adjust a width of beam, the terminal with a larger number of beam directions may divide beam directions into groups.

Referring to FIG. 17, a terminal C 1702 has 4 beam directions. A terminal D 1704 has 8 beam directions. The terminal C 1702 and the terminal D 1704 are located diagonally. Even when the terminal D sweeps by adjusting a width of beam only for directions 1, 3, 5 and 7, no discovery communication with the terminal C may be performed. In this case, the terminal D may determine a beam pattern by making a beam group. As an example, the terminal D may make beam directions 1, 3, 5 and 7 as an advance group and beam directions 2, 4, 6 and 8 as a second group. The terminal C may sweep to transmit a beam in the direction 2, and the terminal D may receive a beam in the direction 7 by sweeping only the directions of the beams of the advance group. In this case, if the terminal C and the terminal D can discover each other, discovery communication may be performed.

When the terminal C and the terminal D cannot discover each other, the terminal D may try discovery by sweeping only the beam directions of the second group. As an example, the terminal C may sweep to transmit a beam in the direction 2, and the terminal D may receive a beam in the direction 6 by sweeping only the directions of the beams of the advance group. The terminal D may try discovery by sweeping the directions of beams of the advance group in a slot next to a slot in which discovery is attempted for the directions of beams of the advance group.

As yet another example, when a terminal generates two beam sweep pattern groups and fails in discovery by using one of the beam sweep pattern groups, the terminal may try discovery by using the other beam sweep pattern group as an alternative.

As yet another example, when a terminal generates a plurality of beam sweep pattern groups and fails in discovery by using one of the beam sweep pattern groups, the terminal may try discovery by using another beam sweep pattern group. A terminal may perform a beam search through beam sweep pattern grouping.

Figure 18:
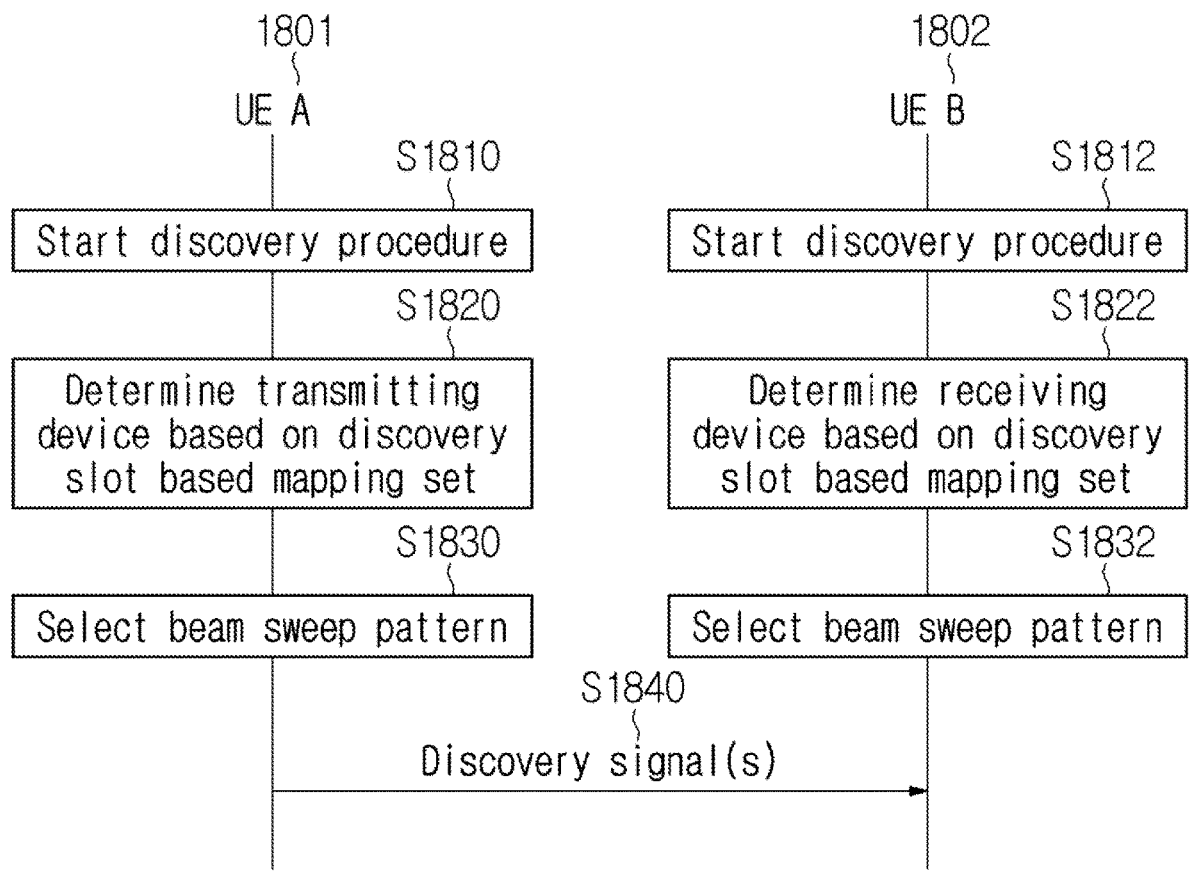
FIG. 18 is a view illustrating an example of a discovery procedure that is applicable to the present disclosure.

FIG. 18 is a view illustrating an example of a discovery procedure that is applicable to the present disclosure. Specifically, FIG. 18 is a view illustrating a discovery procedure of a terminal A 1801 and a terminal B 1802. At step S1810, a discovery procedure of the terminal A 1801 starts. At step S1812, a discovery procedure of the terminal B 1802 starts. As an example, at steps S1810 and S1812, the discovery procedures of the terminal A 1801 and the terminal B 1802 may start at the same time.

At step S1820, the terminal A 1801 may be determined as a transmitting device based on a discovery slot based mapping set. At step S1822, the terminal B 1802 may be determined as a receiving device based on a discovery slot based mapping set. As an example, the terminal A 1801 may receive information on a location of the terminal A. As an example, the terminal A may receive information on its location from GNSS. As another example, the terminal A may receive information on its location from a base station. The terminal A 1801 may calculate a zone ID based on information on its location. The terminal A 1801 may generate a discovery shift value based on information on its location. The terminal A 1801 may generate a discovery shift value based on a zone ID. As an example, the terminal A 1801 may generate a discovery shift value by using the equation below.

$$\text{Shift\_discovery} = (\text{Discovery Zone id}) \bmod (\text{Nslot})$$

Nslot may means the number of discovery slots in a discovery frame. The terminal A 1801 may generate a discovery shift value by considering a size of the terminal A 1801. As an example, the terminal A 1801 may select m5 from the zone ID ENUMERATED {m5, m10, m20, m30, m40, m50, spare1, spare2}. m5 may mean that one space of a zone ID has a size of 5 m. In case the whole length of the terminal A is closer to 5 m than to 10 m, the terminal A 1801 may select m5 and select a zone ID by considering a size of the terminal A. The terminal A 1801 may generate a discovery shift value based on a zone ID of m5. The terminal A 1801 may perform transmission or reception mapping in a discovery frame based on a discovery shift value. That is, the terminal A 1801 may determine discovery slot mapping based on a discovery shift value. As an example, the terminal A 1801 may be determined as Tx in a specific discovery slot.

At step S1822, the terminal B 1802 may be determined as a receiving device based on a discovery slot based mapping set. Like at step S1820, the terminal B 1802 may generate a discovery shift value by considering the location and size of the terminal B 1802. Accordingly, the terminal B 1802 may determine discovery slot mapping based on a discovery shift value. As an example, the terminal B 1802 may be determined as Rx in a specific discovery slot.

In case a beam direction of the terminal A 1801 and a beam direction of the terminal B 1802 face each other, a discovery procedure may end without a beam sweep pattern being determined.

At step S1830, the terminal A 1801 may select a beam sweep pattern. At step S1832, the terminal B 1802 may select a beam sweep pattern. At step S1840, the terminal A 1801 may transmit a discovery signal to the terminal B 1802. At step S1840, the terminal B 1802 may receive a discovery signal from the terminal A 1801.

As an example, in case the terminal A 1801 and the terminal B 1802 have a same number of beams, the terminal A 1801 in Tx mode may transmit a single beam repeatedly as many times as the number of beams to the terminal B 1802 in Rx mode. The terminal A may sweep a beam to transmit a beam to the terminal B. The terminal B may sweep a beam to receive a beam from the terminal A.

As an example, the terminal A may have a larger number of beams than the terminal B. That is, the terminal A may have more beam directions than those of the terminal B. The terminal A may not sweep all of its beam directions but sweep only some beam directions. Herein, the terminal A may sweep some of the beam directions by adjusting a width of a beam. Based on such a beam sweep pattern thus determined, the terminal A may transmit a discovery signal to the terminal B, and the terminal B may receive the discovery signal from the terminal A.

As an example, the terminal A may have more beams than those of the terminal B. In case the terminal A tries discovery but fails by sweeping a beam group including only some of the beams, it may try discovery by sweeping another beam group. Herein the sweep of the beam group may be performed in a slot next to the slot in which the discovery fails. Based on such a beam sweep pattern thus determined, the terminal A may transmit a discovery signal to the terminal B, and the terminal B may receive the discovery signal from the terminal A.

As an example, in case the terminal A and the terminal B are present diagonally, the terminal A with more directions of beams may divide the beams into groups. As another example, in case the terminal A with more beams cannot adjust a width of a beam, the terminal A may divide the directions of beams into groups. The terminal A may divide beams into the above-described advance group and second group, and when discovery fails using the advance group, discovery may be attempted by using the second group in a next slot. Based on such a beam sweep pattern thus determined, the terminal A may transmit a discovery signal to the terminal B, and the terminal B may receive the discovery signal from the terminal A.

Figure 19:
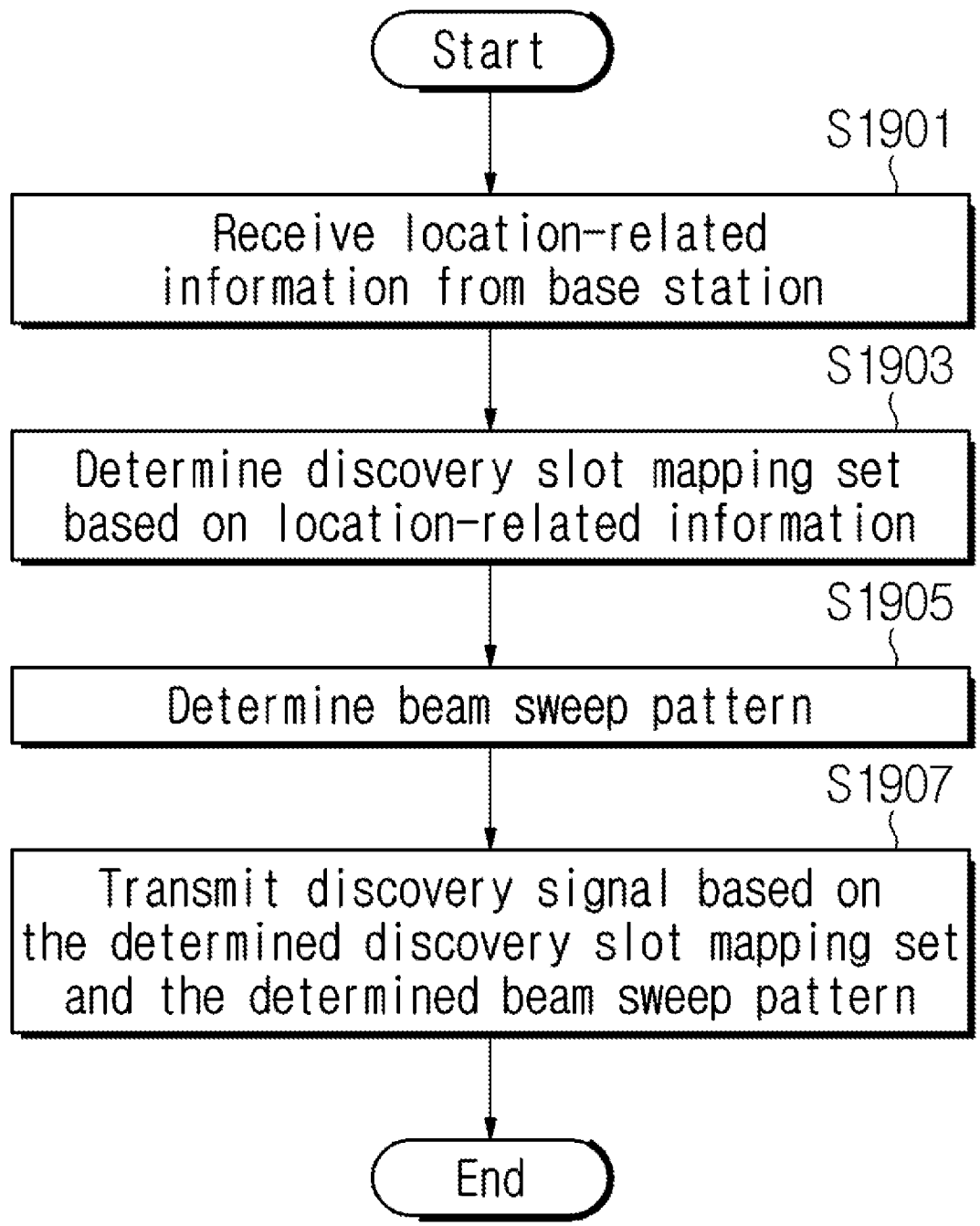
FIG. 19 is a view illustrating a procedure of transmitting and receiving a discovery signal, which is applicable to the present disclosure.

FIG. 19 is a view illustrating a procedure of transmitting and receiving a discovery signal, which is applicable to the present disclosure. At step S1901, a terminal may receive information on its location. As an example, the terminal may receive the information on its location from GNSS. As another example, the terminal may receive information on its location from a base station.

At step S1903, the terminal may determine a discovery slot mapping set based on the information on its location. The terminal may calculate a discovery zone ID based on the information on its location. The terminal may generate a discovery shift value based on the zone ID. As an example, the terminal may generate the discovery shift value by using the equation below.

$$\text{Shift\_discovery} = (\text{Discovery Zone id}) \bmod (\text{Nslot})$$

Nslot may means the number of discovery slots in a discovery frame. The terminal may generate the discovery shift value by considering a size of the terminal. As an example, the terminal may select m5 from the zone ID ENUMERATED {m5, m10, m20, m30, m40, m50, spare1, spare2}. Accordingly, the terminal may generate the discovery shift value based on the zone ID of m5. The terminal may perform transmission or reception mapping in a discovery frame based on the discovery shift value. That is, the terminal may determine discovery slot mapping based on the discovery shift value. As an example, the terminal may perform mapping by Tx in a specific discovery slot. Based on the discovery shift value, the terminal may determine a discovery slot based mapping set for a plurality of discovery slots.

In case the beams of terminals performing a discovery procedure face each other, the terminals may transmit and receive a discovery signal and end the discovery procedure without determining a beam sweep pattern.

At step S1905, a terminal may determine a beam sweep pattern. As an example, in case a transmitting terminal and a receiving terminal have a same number of beams, the transmitting terminal may transmit a single beam to the receiving terminal repeatedly as many times as the number of beams.

As an example, a receiving terminal may have a larger number of beams than a transmitting terminal. The receiving terminal may not sweep all of its beam directions but sweep only some beam directions. As an example, the receiving terminal may sweep only a first beam group. Herein, the receiving terminal may sweep by adjusting a width of a beam of the first beam group. As an example, the receiving terminal may sweep by increasing the width of a beam of the first beam group.

As an example, the number of beams of a receiving terminal may be larger than that of beams of a transmitting terminal. The receiving terminal may sweep only a first beam group including some beams. In case the receiving terminal fails in discovery by sweeping a first beam group, it may try discovery by sweeping a second beam group that is another beam group. The sweep may be performed in a slot next to a slot in which discovery fails. A terminal with a smaller number of beams may also perform a sweep by dividing the beams into groups, and the present disclosure is not limited to the above-described embodiment. A transmitting terminal may have a larger number of beams than a receiving terminal, and the present disclosure is not limited to the above-described embodiment.

As an example, a receiving terminal and a transmitting terminal may be located diagonally, the receiving terminal may have more beams than the transmitting terminal. The receiving terminal with more beams may divide the beams into groups. As another example, in case the receiving terminal with more beams cannot adjust a width of a beam, the receiving terminal may divide the beams into groups. The receiving terminal may divide the beams into the above-described advance group and second group. When the receiving terminal fails in discovery by using the advance group, the receiving terminal may try discovery by using the second group in a next slot.

At step S1907, a terminal may transmit a discovery signal based on the determined discovery slot mapping set and the determined beam sweep pattern.

Figure 20:
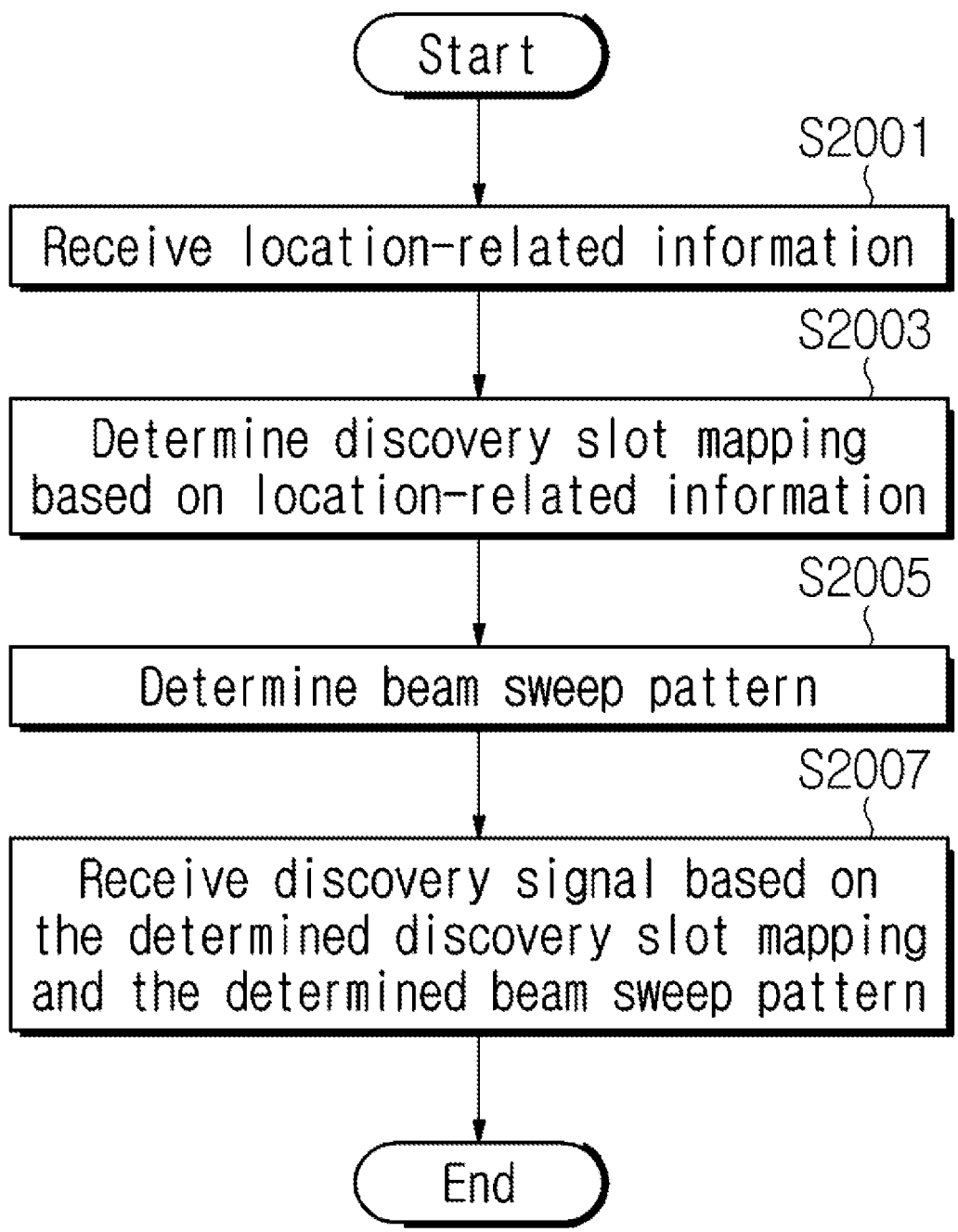
FIG. 20 is a view illustrating a procedure of transmitting and receiving a discovery signal, which is applicable to the present disclosure.

FIG. 20 is a view illustrating a procedure of transmitting and receiving a discovery signal, which is applicable to the present disclosure. At step S2001, a terminal may receive information on its location. As an example, the terminal may receive the information on its location from GNSS. As another example, a terminal may receive information on its location from a base station.

At step S2003, the terminal may determine discovery slot mapping based on the information on its location. The terminal may calculate a discovery zone ID based on the information on its location. The terminal may generate a discovery shift value based on the zone ID. As an example, the terminal may generate the discovery shift value by using the equation below.

Shift_discovery=(Discovery Zone id)mod(Nslot)

Nslot may means the number of discovery slots in a discovery frame. The terminal may generate the discovery shift value by considering a size of the terminal. As an example, the terminal may select m5 from the zone ID ENUMERATED {m5, m10, m20, m30, m40, m50, spare1, spare2}. Accordingly, the terminal may generate the discovery shift value based on the zone ID of m5. The terminal may perform transmission or reception mapping in a discovery frame based on the discovery shift value. That is, the terminal may determine discovery slot mapping based on the discovery shift value. As an example, the terminal may perform mapping by Rx in a specific discovery slot. Based on the discovery shift value, the terminal may determine a discovery slot based mapping set for a plurality of discovery slots.

In case the beams of terminals performing a discovery procedure face each other, the terminals may transmit and receive a discovery signal and end the discovery procedure without determining a beam sweep pattern.

At step S2005, the terminal may determine a beam sweep pattern. As an example, in case a transmitting terminal and a receiving terminal have a same number of beams, the transmitting terminal may transmit a single beam to the receiving terminal repeatedly as many times as the number of beams.

As an example, a receiving terminal may have a larger number of beams than a transmitting terminal. The receiving terminal may not sweep all of its beam directions but sweep only some beam directions. As an example, the receiving terminal may sweep only a first beam group. Herein, the receiving terminal may sweep by adjusting a width of a beam of the first beam group. As an example, the receiving terminal may sweep by increasing the width of a beam of the first beam group.

As an example, the number of beams of a receiving terminal may be larger than that of beams of a transmitting terminal. The receiving terminal may sweep only a first beam group including some beams. In case the receiving terminal fails in discovery by sweeping a first beam group, it may try discovery by sweeping a second beam group that is another beam group. The sweep may be performed in a slot next to a slot in which discovery fails. A terminal with a smaller number of beams may also perform a sweep by dividing the beams into groups, and the present disclosure is not limited to the above-described embodiment. A transmitting terminal may have a larger number of beams than a receiving terminal, and the present disclosure is not limited to the above-described embodiment.

As an example, a receiving terminal and a transmitting terminal may be located diagonally, the receiving terminal may have more beams than the transmitting terminal. The receiving terminal with more beams may divide the beams into groups. As another example, in case the receiving terminal with more beams cannot adjust a width of a beam, the receiving terminal may divide the beams into groups. The receiving terminal may divide the beams into the above-described advance group and second group. When the receiving terminal fails in discovery by using the advance group, the receiving terminal may try discovery by using the second group in a next slot.

At step S2007, the terminal may receive a discovery signal based on the determined discovery slot mapping and the determined beam sweep pattern.

Figure 21:
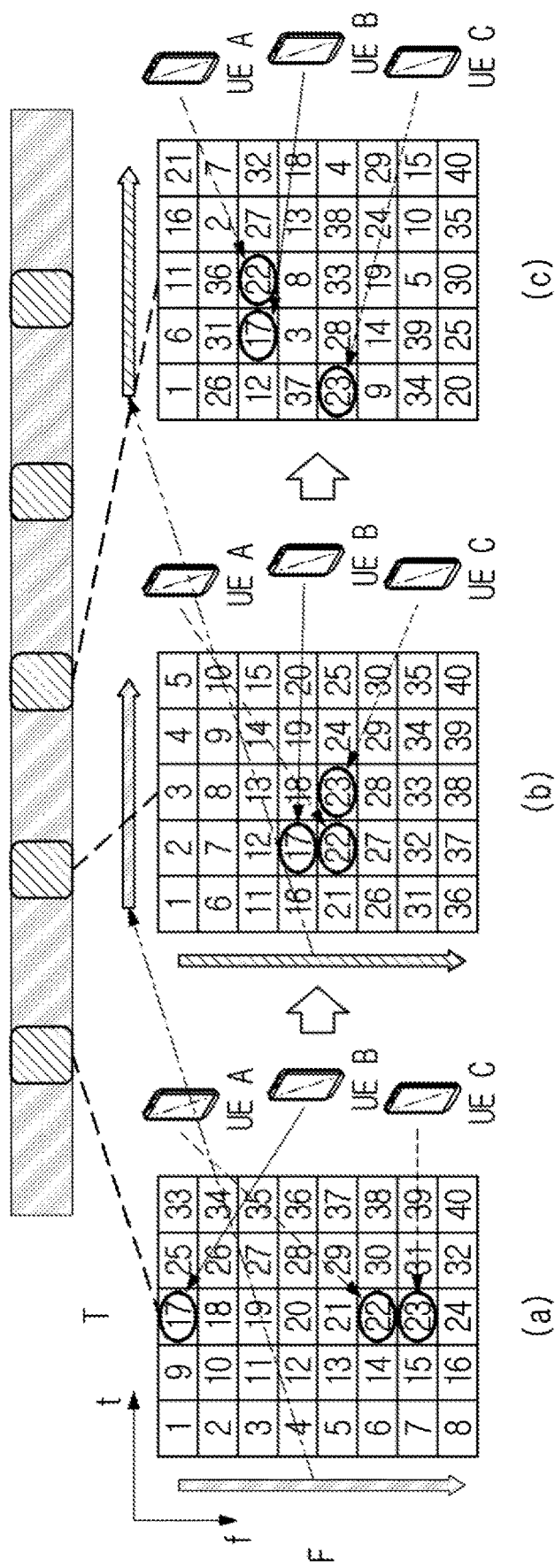
FIG. 21 illustrates an embodiment of a method for determining a synchronization signal transmission time between vehicles, which is applicable to the present disclosure.

FIG. 21 illustrates an embodiment of a method for determining a synchronization signal transmission time between vehicles, which is applicable to the present disclosure. There is a case in which a vehicle cannot perform transmission and reception synchronously with another vehicle. In this case, when vehicles always transmit a signal simultaneously, the vehicles cannot receive a signal from each other. In order to solve this problem, the present disclosure proposes a method of differentiating transmission times between vehicles.

A synchronization signal transmission interval for an initial access cannot be large without limit. Accordingly, a plurality of vehicles within one cell may have transmission times overlapping each other. When a vehicle transmits a signal at a same time within a transmission interval of each period, it cannot communicate with other vehicles that have an overlapping transmission time. Accordingly, it is necessary for vehicles to transmit a signal at a different time within a transmission interval in each of their synchronization signal transmission periods. A base station may manage such determination of synchronization signal times. Determining synchronization signal times for a plurality of vehicles may be a burden on a base station. In addition, a problem may occur to communication when a vehicle starts outside the coverage of a base station or gets out of the coverage while running. The present disclosure proposes a method of determining a synchronization signal time of a vehicle and a method of efficiently assigning synchronization signal times to vehicles.

Figure 22:
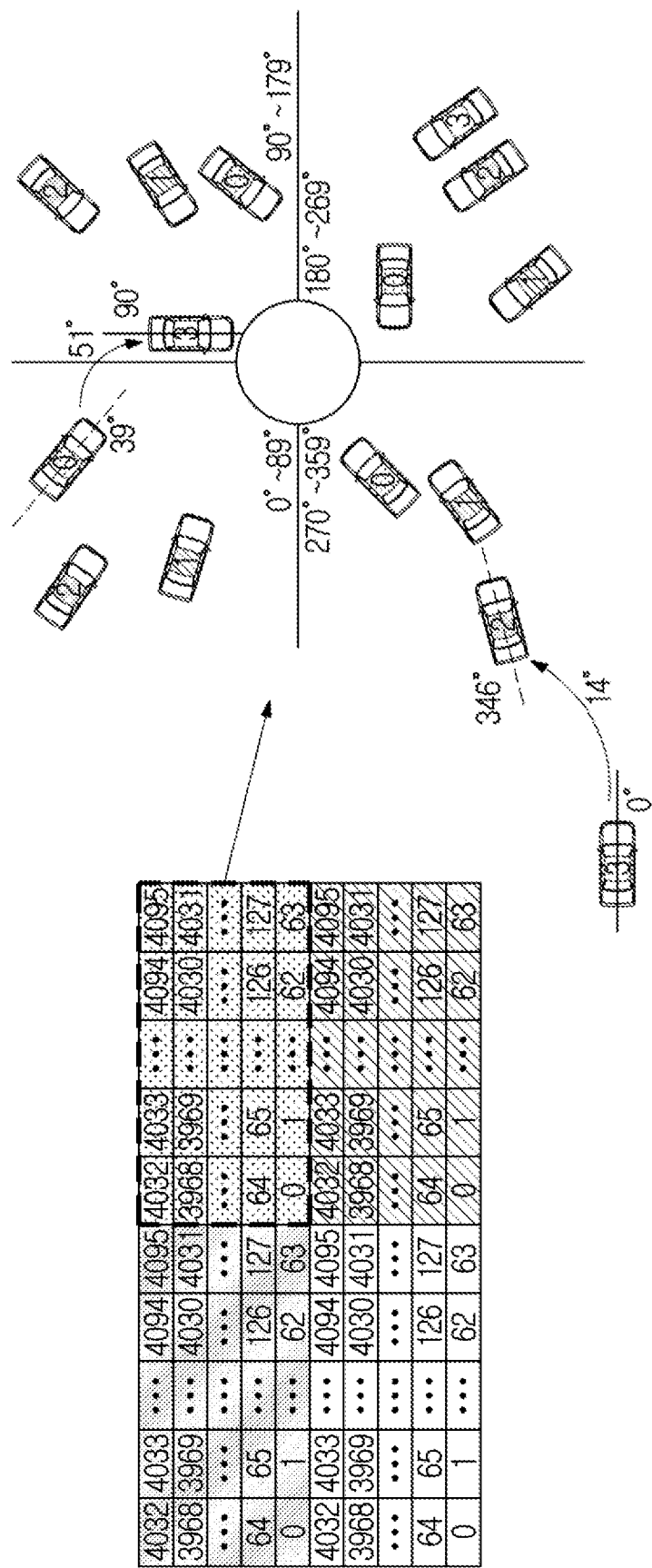
FIG. 22 illustrates an embodiment of a method for determining a synchronization signal transmission time between vehicles, which is applicable to the present disclosure.

FIG. 22 illustrates an embodiment of a method for determining a synchronization signal transmission time between vehicles, which is applicable to the present disclosure. Use cases at 60 GHz frequency may include an application like see-through and bird's eyes view. Such use cases may require streaming of a massive amount of data. In addition, such use cases may require communication of a vehicle running in a same direction. Based on a compass, a vehicle may know information on a direction in which it is running. A compass may be present in a vehicle. A terminal may determine a synchronization signal transmission time based on a zone ID by considering the information on a direction. As an example, a terminal may attach 2-bit direction information to a zone ID. Referring to FIG. 22, when a vehicle changes a direction, the vehicle may predict a changed direction by means of a steering wheel or predict the changed direction by calculating the azimuth through a compass. The vehicle may assign a new transmission time by considering the changed direction. When a vehicle moves out of a corresponding block, the vehicle may predict a direction in a new block by using a steering wheel or predict the direction by calculating the azimuth through a compass. In addition, the vehicle may assign a new transmission time by considering the changed direction.

Figure 23:
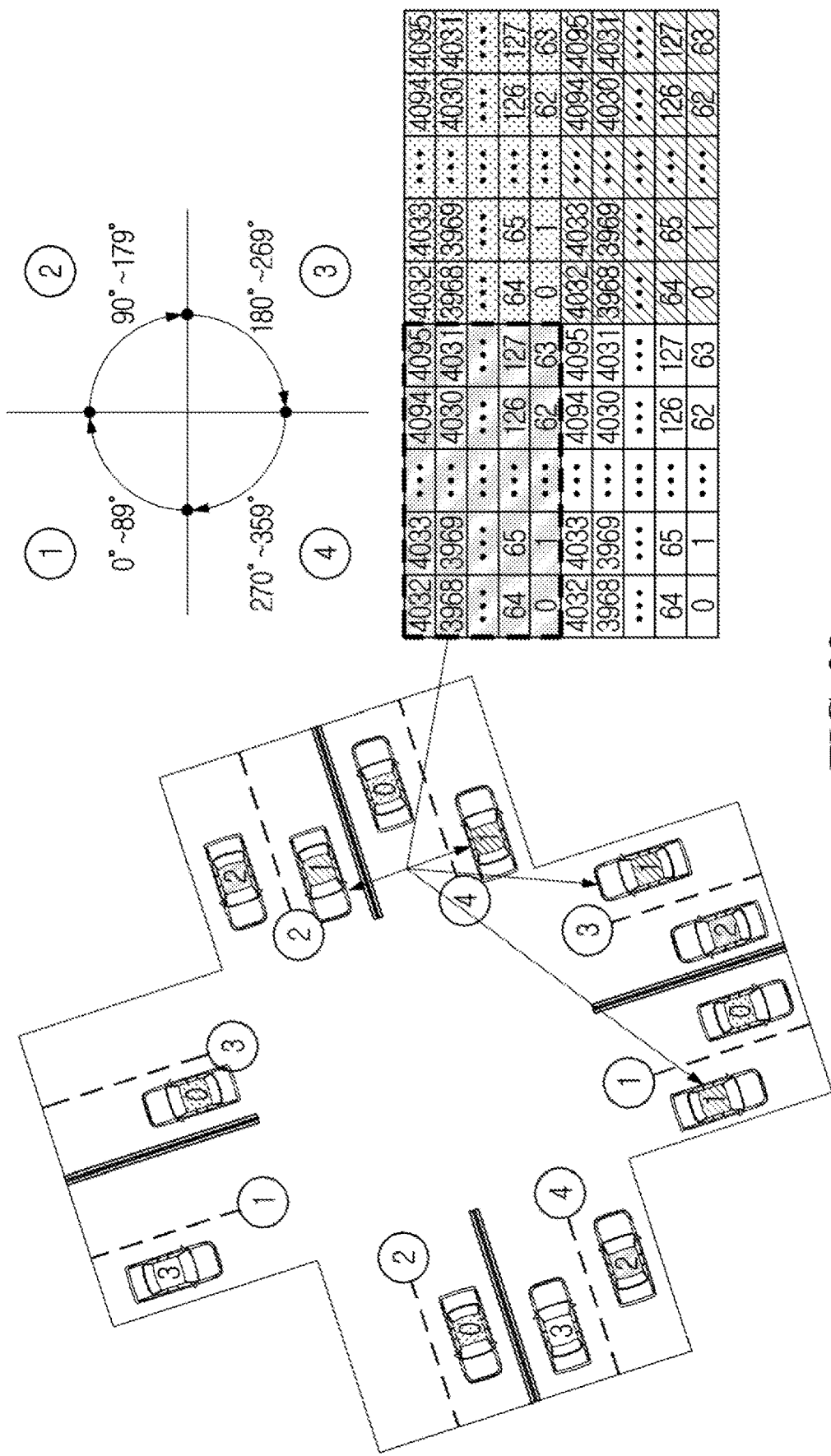
FIG. 23 is a view illustrating an embodiment of a method for determining a synchronization signal transmission time, which is applicable to the present disclosure.

FIG. 23 illustrates an embodiment of a method for determining a synchronization signal transmission time between vehicles, which is applicable to the present disclosure. A vehicle may know information on a direction of the vehicle based on its compass. Referring to FIG. 23, when the vehicle knows its direction, it may have an effect that a single block is classified into 4 zone IDs. The vehicle may further add azimuth information to a zone ID. As an example, the vehicle may make a further division by adding 2-bit azimuth information to a zone ID.

Systems and Various Devices to which Embodiments of the Present Disclosure are Applicable Various embodiments of the present disclosure may be combined with each other.

Hereinafter, a device will be described to which various embodiments of the present disclosure is applicable. Although not limited thereto, various descriptions, functions, procedures, proposals, methods and/or operation flowcharts disclosed in this document are applicable to various fields requiring wireless communication/connection (e.g., 5G) between devices.

Hereinafter, it will be described in greater detail with reference to the drawings. In the following drawings/description, the same reference numerals may denote the same or corresponding hardware blocks, software blocks or functional blocks unless otherwise stated.

Figure 24:
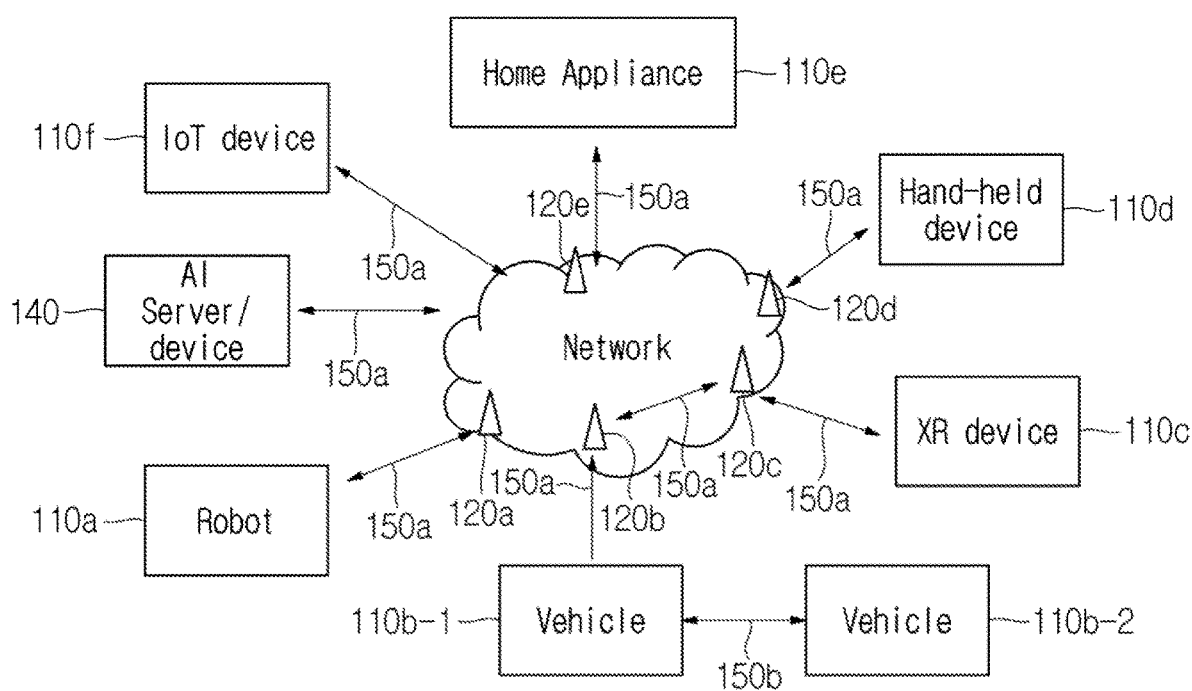
FIG. 24 illustrates an example of a communication system according to an embodiment of the present disclosure.

FIG. 24 illustrates an example of a communication system according to an embodiment of the present disclosure. An embodiment of FIG. 24 may be combined with various embodiments of the present disclosure.

Referring to FIG. 24, a communication system, which is applicable to the present disclosure, includes a wireless device, a base station, and a network. Herein, the wireless device means a device, which performs communication using a radio access technology (e.g., 5G NR, LTE), and may be referred to as communication/radio/5G device. The wireless device may include, without being limited to, at least one of a robot 110a, vehicles 110b-1 and 110b-2, an extended reality (XR) device 110c, a hand-held device 110d, a home appliance 110e, an Internet of Things (IoT) device 110f, and an artificial intelligence (AI) device/server 110g. For example, the vehicles may include a vehicle having a wireless communication function, an autonomous vehicle, and a vehicle capable of performing vehicle-to-vehicle communication. Herein, the vehicles 110b-1 and 110b-2 may include an unmanned aerial vehicle (UAV) (e.g., a drone). The XR device 110c may include an augmented Reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device 110d may include a smartphone, a smartpad, a wearable device (e.g., a smartwatch or a smartglasses), and a computer (e.g., a notebook). The home appliance 110e may include a TV, a refrigerator, and a washing machine. The IoT device 110f may include a sensor and a smartmeter. For example, the base stations 120a to 120e and the network may be implemented as wireless devices and a specific wireless device 120a may operate as a base station/network node with respect to other wireless devices.

Here, wireless communication technology implemented in the wireless devices 110a to 110f of this disclosure may include not only LTE, NR and 6G but also narrowband Internet of things for low-power communication. In this case, for example, NB-IoT technology may be an example of LPWAN (Low Power Wide Area Network) technology and may be implemented in the standard such as LTE Cat NB1 and/or LTE Cat NB2, without being limited to the above-described names. Additionally or alternatively, the wireless communication technology implemented in the wireless devices 100a to 100f of the present specification may perform communication based on the LTE-M technology. In this case, as an example, the LTE-M technology may be an example of an LPWAN technology, and may be called various names such as enhanced machine type communication (eMTC). For example, the LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, without being limited to the above-described names. Additionally or alternatively, the wireless communication technology implemented in the wireless devices 100a to 100f of the present specification may include at least any one of ZigBee, Bluetooth, and Low Power Wide Area Network (LPWAN) in consideration of low power communication, without being limited to the above-described names. For example, the ZigBee technology may create PAN (personal area networks) related to small/low-power digital communication based on various standards such as IEEE 802.15.4, and may be called by various names.

The wireless devices 100a to 100f may be connected to a network via the base stations 120a to 120e. An AI technology may be applied to the wireless devices 100a to 100f, and the wireless devices 100a to 100f may be connected to the AI server 110g via a network. The network may be configured using a 3G network, a 4G (e.g., LTE) network, or a 5G (e.g., NR) network. Although the wireless devices 100a to 100f may communicate with each other through the base stations 120*a* to 120*e*/network, the wireless devices 100*a* to 100*f* may perform direct communication (e.g., sidelink communication) with each other without the base stations 120*a* to 120*e*/network. For example, the vehicles 110*b*-1 and 110*b*-2 may perform direct communication (e.g., Vehicle-to-Vehicle (V2V)/Vehicle-to-everything (V2X) communication). In addition, the IoT device 110*f* (e.g., a sensor) may perform direct communication with other IoT devices (e.g., sensors) or other wireless devices 101*a* to 110*f*.

Wireless communication/connections 150*a*, 150*b* and 150*c* may be established between the wireless devices 110*a* to 110*f* and the base stations 120*a* to 120*e* and between the base stations 120*a* to 120*e* and the base stations 120*a* to 120*e*. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and? 150*b*. For example, the wireless communication/connections 150*a* and? 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 25:
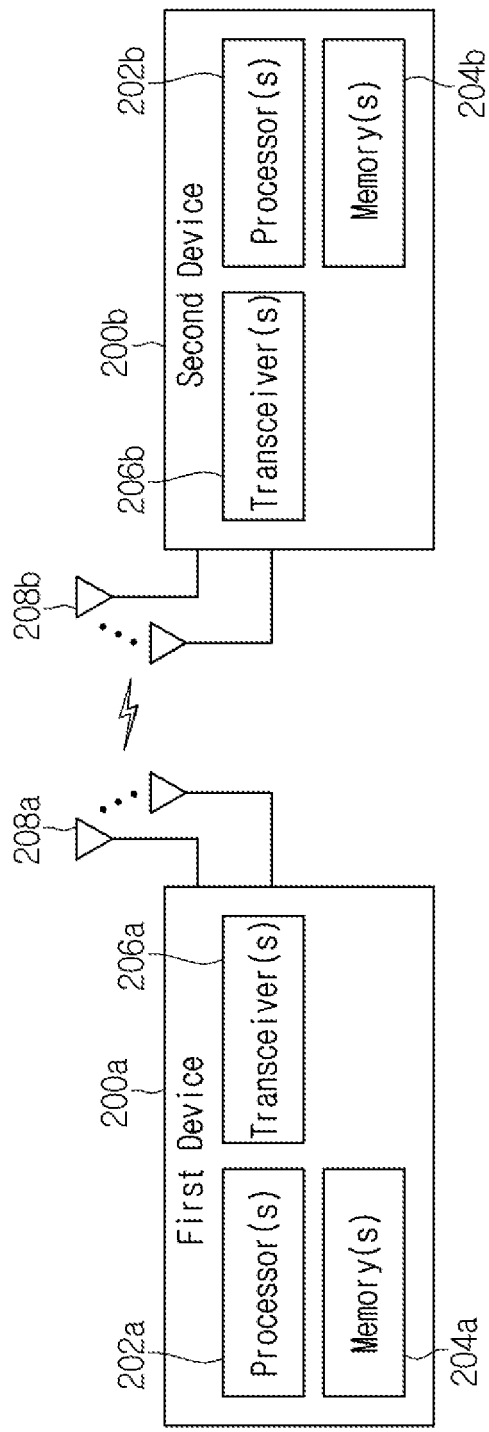
FIG. 25 illustrates an example of a wireless device according to an embodiment of the present disclosure.

FIG. 25 illustrates an example of a wireless device according to an embodiment of the present disclosure. An embodiment of FIG. 25 may be combined with various embodiments of the present disclosure.

Referring to FIG. 25, a first wireless device 200*a* and a second wireless device 200*b* may transmit and receive radio signals through various radio access technologies (e.g., LTE and NR). Herein, {the first wireless device 200*a* and the second wireless device 200*b*} may correspond to {the wireless device 110*x* and the base station 120*x*} and/or {the wireless device 110*x* and the wireless device 110*x*} of FIG. 24.

The first wireless device 200*a* may include one or more processors 202*a* and one or more memories 204*a* and additionally further include one or more transceivers 206*a* and/or one or more antennas 208*a*. The processor(s) 202*a* may control the memory(s) 204*a* and/or the transceiver(s) 206*a* and may be configured to implement the descriptions, functions, procedures, proposals, methods, and/or operational flowcharts disclosed in this document. For example, the processor(s) 202*a* may process information within the memory(s) 204*a* to generate first information/signals and then transmit radio signals including the first information/signals through the transceiver(s) 206*a*. In addition, the processor(s) 202*a* may receive radio signals including second information/signals through the transceiver 206*a* and then store information obtained by processing the second information/signals in the memory(s) 204*a*. The memory(s) 204*a* may be connected to the processor(s) 202*a* and may store various information related to operations of the processor(s) 202*a*. For example, the memory(s) 204*a* may store software code including commands for performing a part or the entirety of processes controlled by the processor(s) 202*a* or for performing the descriptions, functions, procedures, proposals, methods, and/or operational flowcharts disclosed in this document. Herein, the processor(s) 202*a* and the memory(s) 204*a* may be a part of a communication modem/circuit/chip designed to implement RAT (e.g., LTE or NR). The transceiver(s) 206*a* may be connected to the processor (s) 202*a* and transmit and/or receive radio signals through one or more antennas 208*a*. Each of the transceiver(s) 206*a* may include a transmitter and/or a receiver. The transceiver (s) 206*a* may be used interchangeably with a radio frequency (RF) unit. In the present disclosure, the wireless device may represent a communication modem/circuit/chip.

As an example, a first wireless device may be a terminal transmitting a discovery signal. The terminal may include a transceiver and a processor coupled with the transceiver. The transceiver receives the location-related information of the terminal, and the processor generates a zone identity (zone ID) based on the location-related information of the terminal and determines discovery slot mapping based on the zone ID, and the transceiver may transmit a discovery signal based on the discovery slot mapping set. The determination of discovery slot mapping based on the zone ID may be generating a shift discovery value based on the zone ID and determining the discovery slot mapping set based on the shift discovery. Receiving the location-related information of the terminal may be receiving the location-related information of the terminal based on a global navigation satellite system (GNSS). The zone ID may be a zone ID having a size of m5. The processor may determine a beam sweep pattern and transmit the discovery signal in consideration of the beam sweep pattern. As an example, determining the beam sweep pattern may include sweeping a first beam group first and, when the discovery fails, sweeping a second beam group. As another example, determining the beam sweep pattern may include adjusting a beam width of the first beam group.

As another example, the first wireless device may be a terminal that receives a discovery signal. The terminal may include a transceiver and a processor coupled with the transceiver. The transceiver may receive information on a location of the terminal. The processor may generate a zone ID (zone identity) based on the information on the location of the terminal. Discovery slot mapping may be determined based on the zone ID. The transceiver may receive a discovery signal based on the discovery slot mapping.

As another example, the first wireless device may be a device including at least one memory and at least one processor functionally coupled with the at least one memory. The at least one processor may control the device to receive information on a location of the device. The at least one processor may control the device to generate a zone ID (zone identity) based on the information on the location of the device. The at least one processor may control the device to determine discovery slot mapping based on the zone ID. The at least one processor may control the device to transmit a discovery signal based on the discovery slot mapping set.

The second wireless device 200*b* performs wireless communication with the first wireless device 200*a*, and includes one or more processors 202*b* and one or more memories 204*b* and may additionally include one or more transceivers 206*b* and/or one or more antennas 208*b*. The functions of the one or more processors 202*b*, one or more memories 204*b*, one or more transceivers 206*b*, and/or one or more antennas 208*b* are similar to the one or more processors 202*a*, one or more memories 204*a*, one or more transceivers 206*a* and/or one or more antennas 208*a* of the first wireless device 200*a*.

Hereinafter, hardware elements of the wireless devices 200*a* and 200*b* will be described more specifically. One or more protocol layers may be implemented by, without being limited to, the one or more processors 202*a* and 202*b*. For example, the one or more processors 202*a* and 202*b* may implement one or more layers (e.g., functional layers such as PHY (physical), MAC (media access control), RLC (radio link control), PDCP (packet data convergence protocol), RRC (radio resource control), SDAP (service data adaptation protocol)). The one or more processors 202a and 202b may generate one or more protocol data units (PDUs), one or more service data units (SDUs), a message, control information, data or information according to the descriptions, functions, procedures, proposals, methods, and/or operational flowcharts disclosed in this document. The one or more processors 202a and 202b may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 206a and 206b. The one or more processors 202a and 202b may receive the signals (e.g., baseband signals) from the one or more transceivers 206a and 206b and acquire the PDUs, SDUs, messages, control information, data, or information according to the descriptions, functions, procedures, proposals, methods, and/or operational flowcharts disclosed in this document.

The one or more processors 202a and 202b may be referred to as controllers, microcontrollers, microprocessors, or microcomputers. The one or more processors 202a and 202b may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 202a and 202b. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 202a and 202b or stored in the one or more memories 204a and 204b so as to be driven by the one or more processors 202a and 202b. The descriptions, functions, procedures, proposals, methods, and/or operational flowcharts disclosed in this document may be implemented using firmware or software in the form of code, commands, and/or a set of commands.

As an example, the first wireless device may be a non-transitory computer-readable medium storing at least one instruction. The computer-readable medium may include the at least one instruction that is executable by a processor. The at least one instruction may instruct the computer-readable medium to receive information on a location of the computer-readable medium. The at least one instruction may instruct the computer-readable medium to generate a zone ID (zone identity) based on the information on the location of the computer-readable medium. The at least one instruction may instruct the computer-readable medium to determine discovery slot mapping based on the zone ID. The at least one instruction may instruct the computer-readable medium to transmit a discovery signal based on the discovery slot mapping.

The one or more memories 204a and 204b may be connected to the one or more processors 202a and 202b and store various types of data, signals, messages, information, programs, code, instructions, and/or commands. The one or more memories 204a and 204b may be configured by a read only memory (ROM), a random access memory (RAM), an erasable programmable read only memory (EPROM), a flash memory, a hard drive, a register, a cash memory, a computer-readable storage media, and/or a combination thereof. The one or more memories 204a and 204b may be located inside and/or outside the one or more processors 202a and 202b. In addition, the one or more memories 204a and 204b may be connected to the one or more processors 202a and 202b through various technologies such as wired or wireless connection.

The one or more transceivers 206a and 206b may transmit user data, control information, and/or radio signals/channels, mentioned in the methods and/or operational flowcharts of this document, to one or more other devices. The one or more transceivers 206a and 206b may receive user data, control information, and/or radio signals/channels, mentioned in the descriptions, functions, procedures, proposals, methods, and/or operational flowcharts disclosed in this document, from one or more other devices. In addition, the one or more transceivers 206a and 206b may be connected to the one or more antennas 208a and 208b, and the one or more transceivers 206a and 206b may be configured to transmit and receive user data, control information, and/or radio signals/channels, mentioned in the descriptions, functions, procedures, proposals, methods, and/or operational flowcharts disclosed in this document, through the one or more antennas 208a and 208b. In this document, the one or more antennas may be a plurality of physical antennas or a plurality of logical antennas (e.g., antenna ports). The one or more transceivers 206a and 206b may convert received radio signals/channels, etc., from RF band signals into baseband signals in order to process received user data, control information, radio signals/channels, etc., using the one or more processors 202a and 202b. The one or more transceivers 206a and 206b may convert the user data, control information, radio signals/channels, etc., processed using the one or more processors 202a and 202b from the base band signals into the RF band signals. To this end, the one or more transceivers 206a and 206b may include (analog) oscillators and/or filters.

Figure 26:
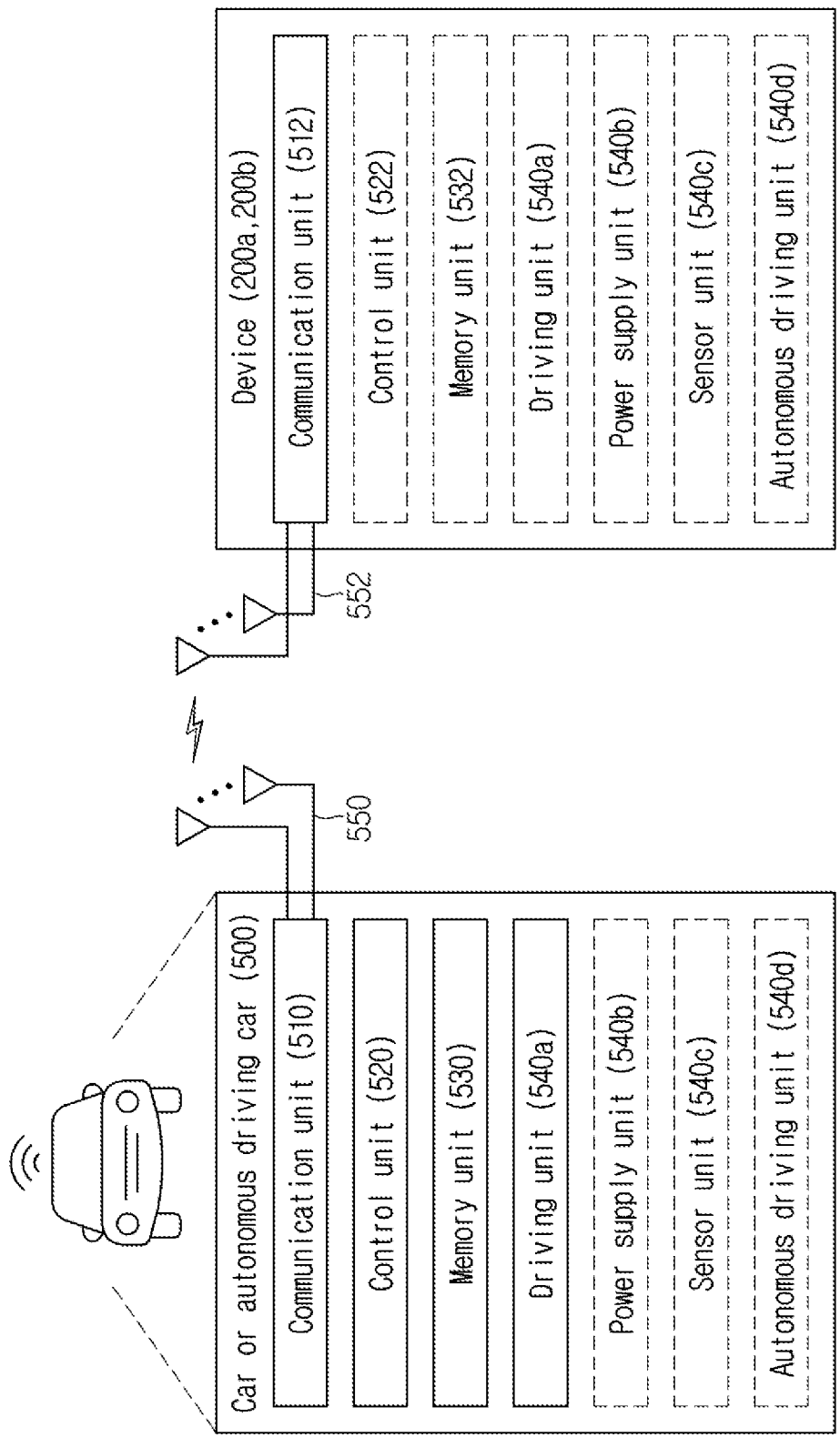
FIG. 26 illustrates an example of a vehicle or an autonomous vehicle according to an embodiment of the present disclosure.

FIG. 26 illustrates an example of a vehicle or an autonomous vehicle according to an embodiment of the present disclosure. FIG. 26 illustrates a vehicle or autonomous vehicle that is applied to the present disclosure. The vehicle or autonomous vehicle may be implemented by a mobile robot, a car, a train, a manned/unmanned aerial vehicle (AV), a ship and the like but is not limited to a vehicle form. An embodiment of FIG. 26 may be combined with various embodiments of the present disclosure.

Referring to FIG. 26, a vehicle or autonomous vehicle 600 may include an antenna unit 608, a communication unit 610, a control unit 620, a driving unit 640a, a power supply unit 640b, a sensor unit 640c, and an autonomous driving unit 640d. The antenna unit 650 may be configured as a part of the communication unit 610. Blocks 610/630/640a to 640d correspond to blocks 510/530/540 of FIG. 36 respectively, and a redundant description will be skipped.

The communication unit 610 may transmit and receive signals (e.g., data and control signals) to and from external devices such as other vehicles, base stations (e.g., base stations and road side units), and servers. The control unit 620 may perform various operations by controlling elements of the vehicle or the autonomous vehicle 100. The control unit 120 may include an electronic control unit (ECU). The driving unit 640a may cause the vehicle or autonomous vehicle 600 to drive on a road. The driving unit 640a may include an engine, a motor, a powertrain, a wheel, a brake, a steering device, etc. The power supply unit 640b may supply power to the vehicle or autonomous vehicle 600 and include a wired/wireless charging circuit, a battery, etc. The sensor unit 640c may acquire a vehicle state, ambient environment information, user information, etc. The sensor unit 640c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 640d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 610 may receive map data, traffic information data, etc., from an external server. The autonomous driving unit 640d may generate an autonomous driving path and a driving plan from the obtained data. The control unit 620 may control the driving unit 640a such that the vehicle or autonomous vehicle 600 may move along the autonomous driving path according to the driving plan (e.g., speed/direction control). In the middle of autonomous driving, the communication unit 610 may aperiodically/periodically acquire recent traffic information data from the external server and acquire surrounding traffic information data from neighboring vehicles. In the middle of autonomous driving, the sensor unit 640c may obtain a vehicle state and/or surrounding environment information. The autonomous driving unit 640d may update the autonomous driving path and the driving plan based on the newly obtained data/information. The communication unit 610 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

As the examples of the proposal method described above may also be included in one of the implementation methods of the present disclosure, it is an obvious fact that they may be considered as a type of proposal methods. In addition, the proposal methods described above may be implemented individually or in a combination (or merger) of some of them. A rule may be defined so that information on whether or not to apply the proposal methods (or information on the rules of the proposal methods) is notified from a base station to a terminal through a predefined signal (e.g., a physical layer signal or an upper layer signal).

The present disclosure may be embodied in other specific forms without departing from the technical ideas and essential features described in the present disclosure. Therefore, the above detailed description should not be construed as limiting in all respects and should be considered illustrative. The scope of the present disclosure should be determined by rational interpretation of the appended claims, and all changes within the equivalent scope of the present disclosure are included in the scope of the present disclosure. In addition, claims having no explicit citation relationship in the claims may be combined to form an embodiment or to be included as a new claim by amendment after filing.

What is claimed is:

1. A method of operating a terminal in a wireless communication system, the method comprising:
    performing, by the terminal, synchronization based on sidelink synchronization signal (SLSS), wherein the SLSS includes primary sidelink synchronization signal (PSSS) and secondary sidelink synchronization signal (SSSS);
    determining, by the terminal, one or more resource pools, wherein the one or more resource pools are configured by a base station based on that sidelink resource allocation mode 1, and the one or more resource pools are determined by the terminal based on that sidelink resource allocation mode 2, wherein a resource pool includes a plurality of contiguous frequency resources in a frequency domain, and a set of slots in a time domain;
    receiving, by the terminal, information on a location of the terminal;
    generating, by the terminal, a zone identity (zone ID) based on the information on the location of the terminal;
    determining, by the terminal, discovery slot mapping in the one or more resource pools based on the zone identity; and
    transmitting, by the terminal, a discovery signal based on the discovery slot mapping.

2. The method of claim 1, wherein the determining of the discovery slot mapping based on the zone identify comprises:
    generating a shift discovery value based on the zone identity; and
    determining a discovery slot mapping set based on the shift discovery value.

3. The method of claim 2, wherein the receiving of the information on the location of the terminal receives the information on the location of the terminal based on a global navigation satellite system (GNSS).

4. The method of claim 1, wherein the zone identify has a size of m5.

5. The method of claim 1, comprising determining a beam sweep pattern,
    wherein the discovery signal is transmitted by further considering the beam sweep pattern.

6. The method of claim 5, wherein the determining of the beam sweep pattern sweeps a first beam group first and, based on discovery failing, sweeps a second beam group.

7. The method of claim 5, wherein the determining of the beam sweep pattern adjusts a beam width of the first beam group.

8. A terminal in a wireless communication system, comprising:
    a transceiver; and
    a processor coupled with the transceiver,
    wherein the processor:
    perform synchronization based on sidelink synchronization signal (SLSS), wherein the SLSS includes primary sidelink synchronization signal (PSSS) and secondary sidelink synchronization signal (SSSS);
    determine one or more resource pools, wherein the one or more resource pools are configured by a base station based on that sidelink resource allocation mode 1, and the one or more resource pools are determined by the terminal based on that sidelink resource allocation mode 2, wherein a resource pool includes a plurality of contiguous frequency resources in a frequency domain, and a set of slots in a time domain;
    receive information on a location of the terminal, generate a zone identify (zone ID) based on the information on the location of the terminal and determine discovery slot mapping in the one or more resource pools based on the zone identify, and transmit a discovery signal based on the discovery slot mapping.

9. The terminal of claim 8, wherein the determining of the discovery slot mapping based on the zone identify generates a shift discovery value based on the zone identity and determines a discovery slot mapping set based on the shift discovery value.

10. The terminal of claim 9, wherein the receiving of the information on the location of the terminal receives the information on the location of the terminal based on a global navigation satellite system (GNSS).

11. The terminal of claim 8, wherein the zone identify has a size of m5.

12. The terminal of claim 8, wherein the processor is further configured to:

determine a beam sweep pattern, and transmit the discovery signal by further considering the beam sweep pattern.

13. The terminal of claim 12, wherein the determining of the beam sweep pattern sweeps a first beam group first and, based on discovery failing, sweeps a second beam group.

14. The terminal of claim 12, wherein the determining of the beam sweep pattern adjusts a beam width of the first beam group.

15. A terminal in a wireless communication system, comprising:

a transceiver; and a processor coupled with the transceiver, wherein the processor:

perform synchronization based on sidelink synchronization signal (SLSS), wherein the SLSS includes primary sidelink synchronization signal (PSSS) and secondary sidelink synchronization signal (SSSS);

determine one or more resource pools, wherein the one or more resource pools are configured by a base station based on that sidelink resource allocation mode 1, and the one or more resource pools are determined by the terminal based on that sidelink resource allocation mode 2, wherein a resource pool includes a plurality of contiguous frequency resources in a frequency domain, and a set of slots in a time domain;

receive information on a location of the terminal, generate a zone identify (zone ID) based on the information on the location of the terminal and determine discovery slot mapping in the one or more resource pools based on the zone identify, and receive a discovery signal based on the discovery slot mapping.

* * * * *